(12) United States Patent
Ishikawa et al.

(10) Patent No.: US 10,953,477 B2
(45) Date of Patent: Mar. 23, 2021

(54) AIR CHUCK PROVIDED WITH LOCKING MECHANISM

(71) Applicant: SMC CORPORATION, Chiyoda-ku (JP)

(72) Inventors: Shintaro Ishikawa, Kasukabe (JP); Kohei Tomita, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/613,340

(22) PCT Filed: Feb. 21, 2018

(86) PCT No.: PCT/JP2018/006098
§ 371 (c)(1),
(2) Date: Nov. 13, 2019

(87) PCT Pub. No.: WO2018/211763
PCT Pub. Date: Nov. 22, 2018

(65) Prior Publication Data
US 2020/0130069 A1    Apr. 30, 2020

(30) Foreign Application Priority Data

May 17, 2017   (JP) .............................. JP2017-098339
Aug. 30, 2017  (JP) .............................. JP2017-165513

(51) Int. Cl.
*B23B 31/175* (2006.01)
*B25J 15/02* (2006.01)
*B23B 31/12* (2006.01)

(52) U.S. Cl.
CPC .... *B23B 31/1276* (2013.01); *B23B 31/16216* (2013.01); *B25J 15/0273* (2013.01);
(Continued)

(58) Field of Classification Search
CPC .......... B23B 31/1276; B23B 2270/027; B23B 31/30; B23B 2260/122; B23B 2231/26;
(Continued)

(56) References Cited

U.S. PATENT DOCUMENTS 4,530,508 A * 7/1985 Ferraro ............. B23B 31/16295
269/99
5,944,326 A    8/1999 Ishibashi et al.
(Continued)

FOREIGN PATENT DOCUMENTS

CA         2320318 A1 * 6/2000 .......... B05B 3/1064
DE   10 2011 115 366 A1    4/2013
(Continued)

OTHER PUBLICATIONS

International Search Report dated May 29, 2018 in PCT/JP2018/006098 filed on Feb. 21, 2018.

*Primary Examiner* — Eric A. Gates
*Assistant Examiner* — Paul M Janeski
(74) *Attorney, Agent, or Firm* — Oblon, McClelland, Maier & Neustadt, L.L.P.

(57) ABSTRACT

A chuck mechanism operates a piston in a cylinder tube by using action of compressed air and opens and closes, by using a rod coupled to the piston, a pair of fingers, thereby gripping work W. The locking mechanism locks the fingers at work grip positions. The locking mechanism includes a first locking member, a second locking member, and a drive device. The first locking member is displaced when the pair of fingers are opened or closed. The second locking member retains the first locking member so as to lock the fingers at the work grip positions. The drive device relatively displaces the first locking member and the second locking member to locking positions and non-locking positions.

9 Claims, 25 Drawing Sheets

(52) U.S. Cl.
CPC ..... *B23B 2231/26* (2013.01); *B23B 2260/122* (2013.01); *B23B 2270/027* (2013.01)

(58) Field of Classification Search
CPC ........ B23B 31/16195; B23B 31/16216; B23B 31/1622; B25B 5/166; B25B 1/24; B25B 5/087; B25B 1/08; B25B 1/18; B25J 15/0273; Y10T 279/32
USPC ......................................................... 279/140
See application file for complete search history.

(56) References Cited

U.S. PATENT DOCUMENTS

| | | | |
|---|---|---|---|
| 6,318,779 B1 * | 11/2001 | Hanne | ..................... B25B 5/061 294/119.1 |
| 8,303,007 B2 * | 11/2012 | Fukano | ................ B25J 15/0273 294/119.1 |
| 10,183,335 B2 * | 1/2019 | Hara | .................... B25J 19/0075 |

FOREIGN PATENT DOCUMENTS

| | | | | |
|---|---|---|---|---|
| EP | 0208827 A1 * | 1/1987 | ......... | B25J 15/0273 |
| EP | 1207023 A1 * | 5/2002 | ............ | B25B 5/163 |
| JP | 49-141565 U | 12/1974 | | |
| JP | 4-2585 U | 1/1992 | | |
| JP | 7-100785 A | 4/1995 | | |
| JP | 10-166290 A | 6/1998 | | |
| JP | 10-225887 A | 8/1998 | | |
| JP | 2008-272867 A | 11/2008 | | |
| JP | 2009-214204 A | 9/2009 | | |
| JP | 2010-69570 A | 4/2010 | | |
| JP | 2016-155199 A | 9/2016 | | |

* cited by examiner

AIR CHUCK PROVIDED WITH LOCKING MECHANISM

TECHNICAL FIELD

The present invention relates to an air chuck that opens and closes, by using action of compressed air, a pair of fingers so as to grip work. More specifically, the present invention relates to the air chuck with a locking mechanism including a locking mechanism for locking the pair of fingers at work grip positions.

BACKGROUND ART

Air chucks that open and close, by using action of compressed air, a pair of fingers to grip work are known as disclosed in Patent Literatures 1 to 3. Generally, these air chucks include an air cylinder mechanism disposed in a body, and the pair of fingers are disposed outside the body such that the pair of fingers are able to be opened and closed. A piston of the air cylinder mechanism is operated by the action of the compressed air, and a rod coupled to the piston displaces the pair of fingers. Thus, the work is gripped between the pair of fingers so as to be redirected or transported to another location.

However, with the related-art air chucks, when supply of the compressed air is stopped due to some cause while the work is gripped by the fingers, the gripping force of the fingers is lost. As a result, the work is moved or dropped. The movement or dropping of the work is likely to lead to damage to the work or damage or the like to devices around the work. In addition, the movement or dropping of the work is very dangerous to operators.

CITATION LIST

Patent Literature

PTL 1: Japanese Unexamined Patent Application Publication No. 7-100785
PTL 2: Japanese Unexamined Patent Application Publication No. 1.0-166290
PTL 3: Japanese Unexamined Patent Application Publication No. 2010-69570

SUMMARY OF INVENTION

Technical Problem

A technical task of the present invention is to provide a very safe air chuck with a locking mechanism with which, even when supply of compressed air is stopped while work is gripped by a pair of fingers, the fingers can be locked at work grip positions so as to prevent the work from dropping.

Solution to Problem

For addressing the above-described problem, an air chuck with a locking mechanism according to the present invention includes a chuck mechanism and a locking mechanism. The chuck mechanism operates a piston in a cylinder tube by using action of compressed air and advances and retracts a rod coupled to the piston so as to open and close a pair of fingers, thereby gripping work. The locking mechanism locks the pair of fingers at work grip positions. The locking mechanism includes at least one first locking member, at least one second locking member, and a drive device. The at least one first locking member is displaced when the pair of fingers are opened or closed. The at least one second locking member retains the at least one first locking member so as to lock the pair of fingers at the work grip positions. The drive device relatively displaces the at least one first locking member and the at least one second locking member to locking positions where the at least one first locking member and the at least one second locking member are retained at each other and to non-locking positions where the at least one first locking member and the at least one second locking member are separated from each other.

According to the present invention, the cylinder tube is accommodated in a cylinder hole of a chuck body such that the cylinder tube is rotatable about an axial line in a reciprocating manner in a certain angular range, and the cylinder tube is coupled to the drive device. Also according to the present invention, the at least one first locking member or the at least one second locking member is driven to the locking position and the non-locking position by the drive device through the cylinder tube.

In this case, it is desired that a first annular channel communicating with a first port provided in the chuck body and a second annular channel communicating with a second port provided in the chuck body be formed between an outer circumference of the cylinder tube and an inner circumference of the cylinder hole so as to surround the outer circumference of the cylinder tube. In this case, it is also desired that a first passage hole connecting the first annular channel and a first pressure chamber on a one side of the piston to each other and a second passage hole connecting the second annular channel and a second pressure chamber on another side of the piston to each other be formed in a side surface of the cylinder tube.

Also according to the present invention, it is desired that the drive device be formed by a swinging actuator, the swinging actuator include an output shaft rotated in a reciprocating manner in a certain angular range by the action of the compressed air, and the output shaft be coupled to the cylinder tube.

According to one specific structural embodiment of the present invention, the at least one first locking member includes a plurality of the first locking members, the at least one second locking member includes a plurality of the second locking members, the pair of fingers are supported by a support rail such that the pair of fingers are able to be opened and closed, the plurality of first locking members are respectively attached to the pair of fingers, and two of the plurality of second locking members are attached to a support member disposed around the support rail. Also according to the one specific structural embodiment of the present invention, one of the support rail and the support member is coupled to the cylinder tube, and, when the support rail or the support member is rotated in a reciprocating manner by the cylinder tube, the plurality of first locking members and the plurality of second locking members are relatively displaced to positions where the plurality of first locking members and the plurality of second locking members are retained at one another and positions where the plurality of first locking members and the plurality of second locking members are separated from one another.

In this case, it is desired that the plurality of first locking members and the plurality of second locking members have wedge surfaces retained at one another, and the wedge surfaces be inclined, toward a circumferential direction that is a displacement direction of the plurality of first locking members or the plurality of second locking members, in a direction intersecting the circumferential direction.

It is also desired that the support member have a ring shape and be disposed so as to surround an outer circumference of the support rail, and the plurality of second locking members be attached to positions opposite to each other in a diameter direction of the support member.

According to another specific structural embodiment of the present invention, the at least one first locking member is formed by a shaft-shaped member provided in the rod in a direction perpendicular to the axial line, and the at least one second locking member is formed by a hook-shaped member able to be retained at the at least one first locking member.

In this case, even when the cylinder tube is rotated, the rod or the at least one first locking member is not necessarily rotated together with the cylinder tube, and the at least one second locking member may be couple to the cylinder tube so as to be rotated together with the cylinder tube.

Advantageous Effects of Invention

According to the present invention, the fingers gripping the work can be locked at the work grip positions by the locking mechanism. Thus, even when supply of the compressed air to the chuck mechanism is stopped due to some cause while the work is gripped, misalignment, dropping, or the like of the work is prevented. Accordingly, damage to the work or damage or the like to devices around the work due to dropping of the work is prevented, and safety of the operator is ensured.

DESCRIPTION OF EMBODIMENT

Figure 1:
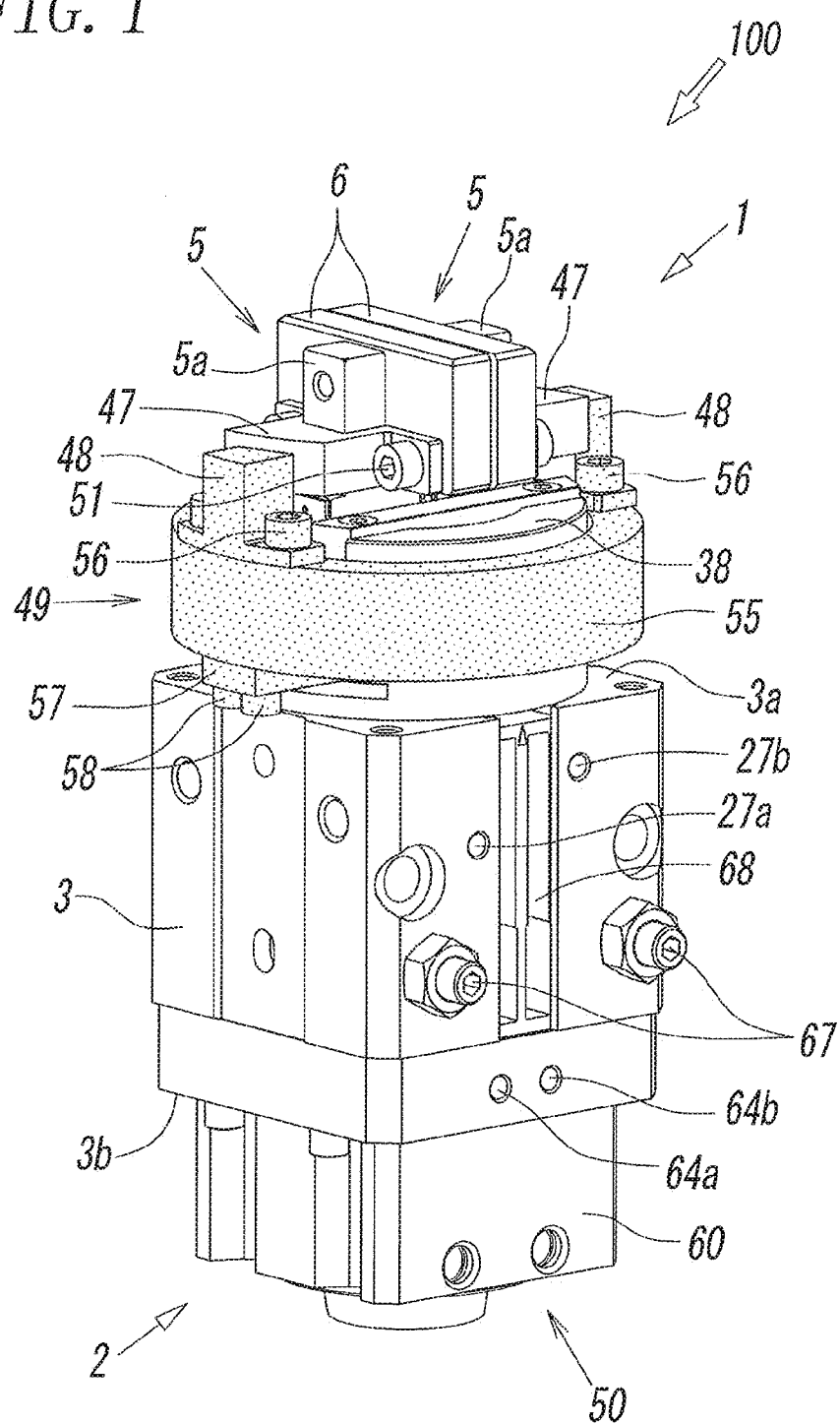
FIG. 1 is a perspective view of a first embodiment of an air chuck according to the present invention with a pair of fingers closed.

FIGS. 1 to 9 illustrate a first embodiment of an air chuck provided with a locking mechanism according to the present invention. An air chuck 100 according to the first embodiment is made by integrally mounting a chuck mechanism 1 and a locking mechanism 2 to a single chuck body 3 having a square block shape along an axial line L passing through the center of the chuck body 3. The chuck mechanism 1 opens/closes a pair of fingers 5, 5 by using an air cylinder device 4 to release/grip work W. The locking mechanism 2 locks the pair of fingers 5, 5 to work grip positions.

As clearly understood from FIGS. 1 to 6, the chuck mechanism 1 includes the air cylinder device 4, the pair of fingers 5, 5, a support rail 8, and a pair of open/close levers 9, 9. The support rail 8 supports the pair of fingers 5, 5 such that the pair of fingers 5, 5 can be opened and closed. The pair of open/close levers 9, 9 convert linear operations of a rod 13 of the air cylinder device 4 into open/close operations of the pair of fingers 5, 5. The specific structure of the chuck mechanism 1 is as follows.

The air cylinder device 4 includes a cylindrical cylinder tube 11, a piston 12, and the rod 13. The cylinder tube 11 is open at one end (upper end) and closed at the other end (lower end). The piston 12 is accommodated in the cylinder tube 11 with a piston packing 14 interposed therebetween such that the piston 12 is slidable in the axial line L direction and relatively rotatable about the axial line L. The rod is coupled to the piston 12 at a proximal end portion and projects from the open end of the cylinder tube 11 to the outside at a distal end portion. A ring-shaped rod cover 15 is airtightly secured to the open end of the cylinder tube 11. The rod 13 is inserted through a central hole of the rod cover 15 with a rod packing 16 interposed therebetween such that the rod 13 is slidable in the axial line L direction and the rod 13 is relatively rotatable about the axial line L.

The piston packing 14 is accommodated in a packing holding groove formed in an outer circumference of the piston 12. The rod packing 16 is accommodated in a packing holding groove formed in an inner circumference of the rod cover 15.

Furthermore, a packing support 17 for preventing the rod packing 16 from, for example, being removed or inclined is attached to a lower end surface of the rod cover 15. A damper 22 for damping shocks occurring when the piston 12 is brought into contact with the packing support 17 of the rod cover 15 is attached to an upper end portion of the piston 12.

A first pressure chamber 18a is formed between the piston 12 and a bottom wall 11a of the cylinder tube 11. A second pressure chamber 18b is formed between the piston 12 and the rod cover 15. A first passage hole 19a and a second passage hole 19b are formed in a side surface of the cylinder tube 11. The first passage hole 19a communicates with the first pressure chamber 18a, and the second passage hole 19b communicates with the second pressure chamber 18b.

Furthermore, a ring-shaped magnet 20 is attached to an end surface of the piston 12 facing the first pressure chamber 18a with a magnet holder 21 interposed therebetween. The magnet 20 serves as a detection target when detecting an operating position of the piston 12.

The cylinder tube 11 is accommodated in, with a bearing 23 interposed therebetween, a cylinder hole 24 formed in the chuck body 3 such that the cylinder tube 11 is rotatable, in a reciprocating manner, in a certain angular range about the axial line L. Furthermore, three cylinder packings 25a, 25b, 25c are provided between an outer circumference of the cylinder tube 11 and an inner circumference of the cylinder hole 24. A first annular channel 26a communicating with the first passage hole 19a and a second annular channel 26b communicating with the second passage hole 19b are formed between the three cylinder packings 25a, 25b, 25c so as to surround the outer circumference of the cylinder tube 11. A first port 27a communicating with the first annular channel 26a and a second port 27b communicating with the second annular channel 26b are provided in a side surface of the chuck body 3.

Accordingly, when the first port 27a and the second port 27b are connected alternately to an air supply side and an air discharge side by using a solenoid (not illustrated), compressed air is alternately supplied to or discharged from the first pressure chamber 18a and the second pressure chamber 18b through the first annular channel 26a, the second annular channel 26b, the first passage hole 19a, and the second passage hole 19b. Thus, the piston 12 and the rod 13 advance/retract (move upward/downward). That is, when the first port 27a is connected to a compressed air source and the second port 27b is open to the atmosphere, the compressed air is supplied to the first pressure chamber 18a. Thus, the piston 12 and the rod 13 move upward (see FIG. 7). In contrast, when the second port 27b is connected to the compressed air source and the first port 27a is open to the atmosphere, the compressed air is supplied to the second pressure chamber 18b. Thus, the piston 12 and the rod 13 move downward (see FIG. 2).

The fingers 5 each have an L shape or an inverted T shape in side view. The finger 5 has a longitudinally elongated gripping portion 5a and a laterally elongated sliding portion 5b connected to a proximal end portion of the gripping portion 5a. A plate-shaped chuck spacer 6 is attached to an inner surface of the gripping portion 5a by screws 32, thereby the work W is gripped between the chuck spacers 6, 6 facing each other.

A single first locking member 47, which will be described later, is attached to each of the two chuck spacers 6, 6. The structure of the first locking member 47 will be described in detail later.

The support rail 8 is a thin member elongated in the left-right direction and has a guide groove 8a extending in the left-right direction in an upper surface thereof. The sliding portions 5b of the fingers 5 are slidably fitted into the guide groove 8a. The support rail 8 is fixedly attached to a rail holder 37 formed on a first end 3a side of the chuck body 3. The rail holder 37 has a cylindrical shape with a central portion thereof removed in the diameter direction. The rail holder 37 has a pair of attachment walls 38, 38 having arcuate outer circumferences and a space 39 formed between the pair of attachment walls 38, 38. Step portions 40 having screw holes 40a are formed in facing surfaces of the pair of attachment walls 38, 38. By placing the support rail 8 on the step portions 40, inserting rail securing screws 41 through screw insertion holes of the support rail 8, and screwing the securing screws 41 into the screw holes 40a, the support rail 8 is secured such that the support rail 8 covers the space 39 between the pair of attachment walls 38, 38.

The rail holder 37 may be integrally formed with the chuck body 3. Alternatively, the rail holder 37 may be separately formed from the chuck body 3 and attached to the chuck body 3 by screws.

The open/close levers 9, 9 are L-shaped members and accommodated in the space 39 covered with the support rail 8. Middle portions of the open/close levers 9, 9 are rotatably supported by lever shafts 44. Both end portions of each of the lever shafts 44 are fitted into support holes 38a, 38a formed in the pair of attachment walls 38, 38 of the rail holder 37. Thus, the open/close levers 9, 9 are supported by the rail holder 37. The open/close levers 9, 9 have U-shaped cuts 9a, 9a at proximal end portions thereof. The cuts 9a, 9a are engaged with an engagement pin 45 disposed at a distal end of the rod 13. Meanwhile, the open/close levers 9, 9 have engagement portions 9b, 9b at distal end portions thereof. The engagement portions 9b, 9b have arcuate outer surfaces. The engagement portions 9b, 9b are swingably fitted into engagement recesses 5c, 5c formed in lower surfaces of the fingers 5, 5 through openings 8b formed in the support rail 8.

Figure 2:
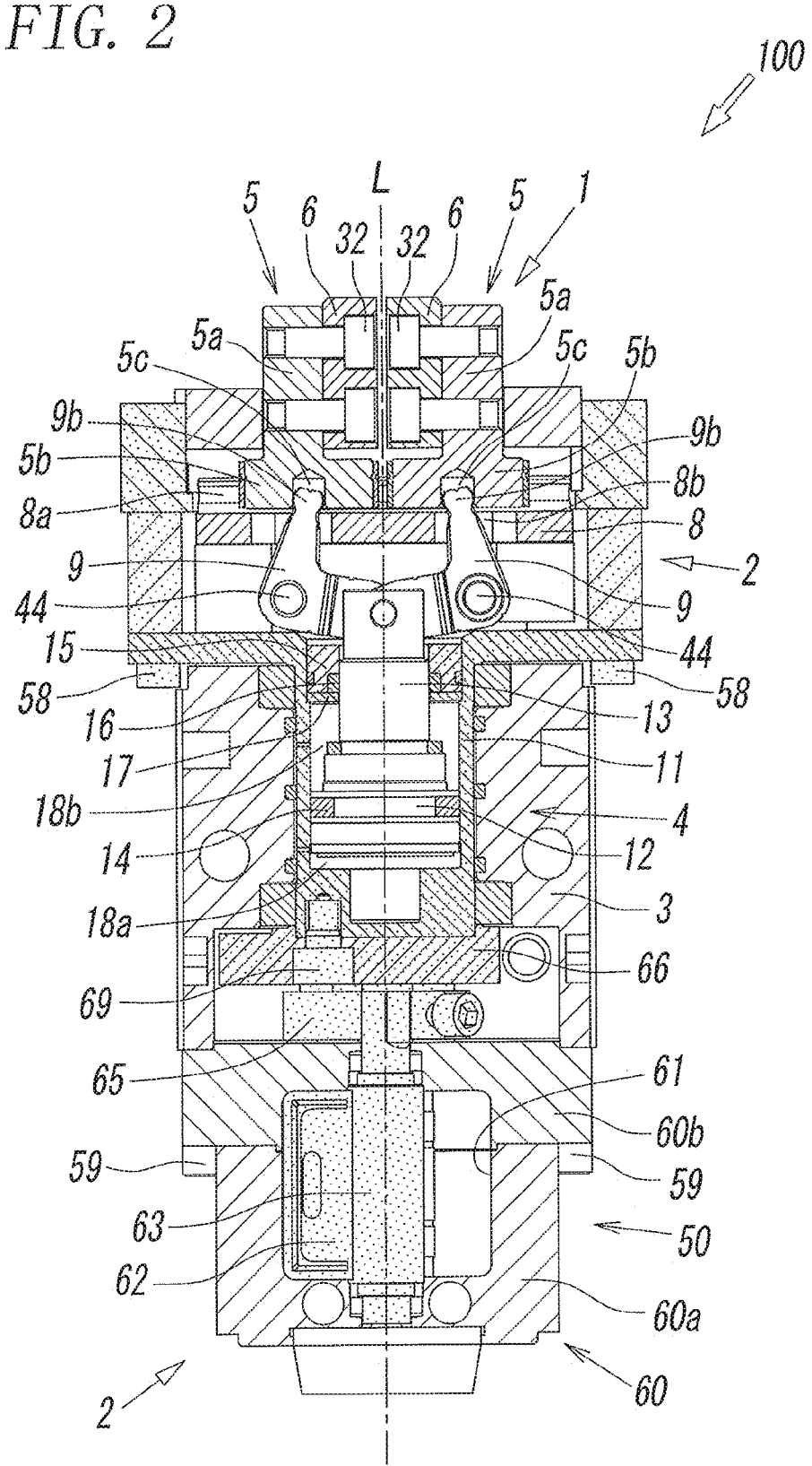
FIG. 2 is a central longitudinal sectional view of FIG. 1.
Figure 3:
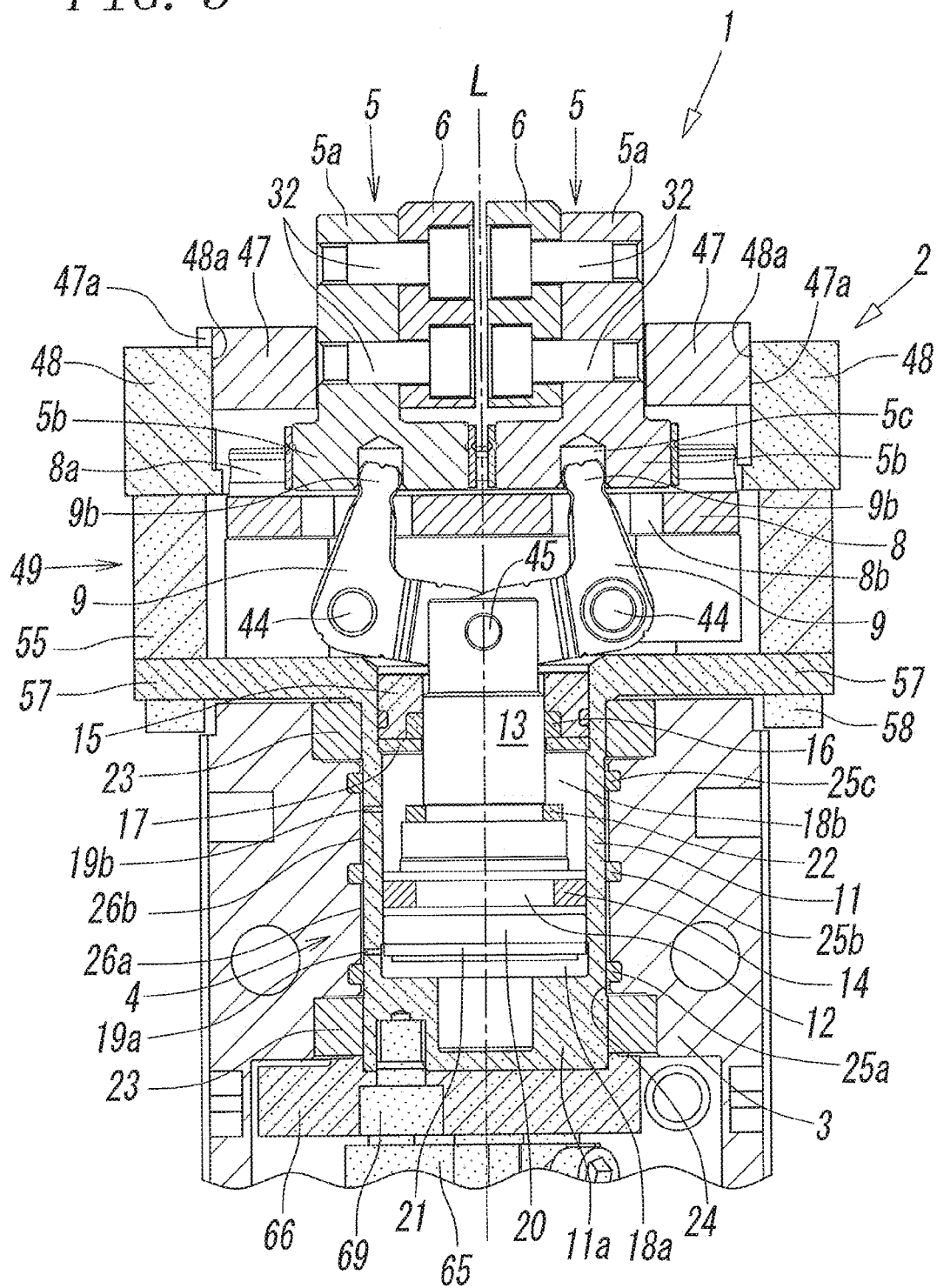
FIG. 3 is an enlarged view of a main part of FIG. 2.
Figure 4:
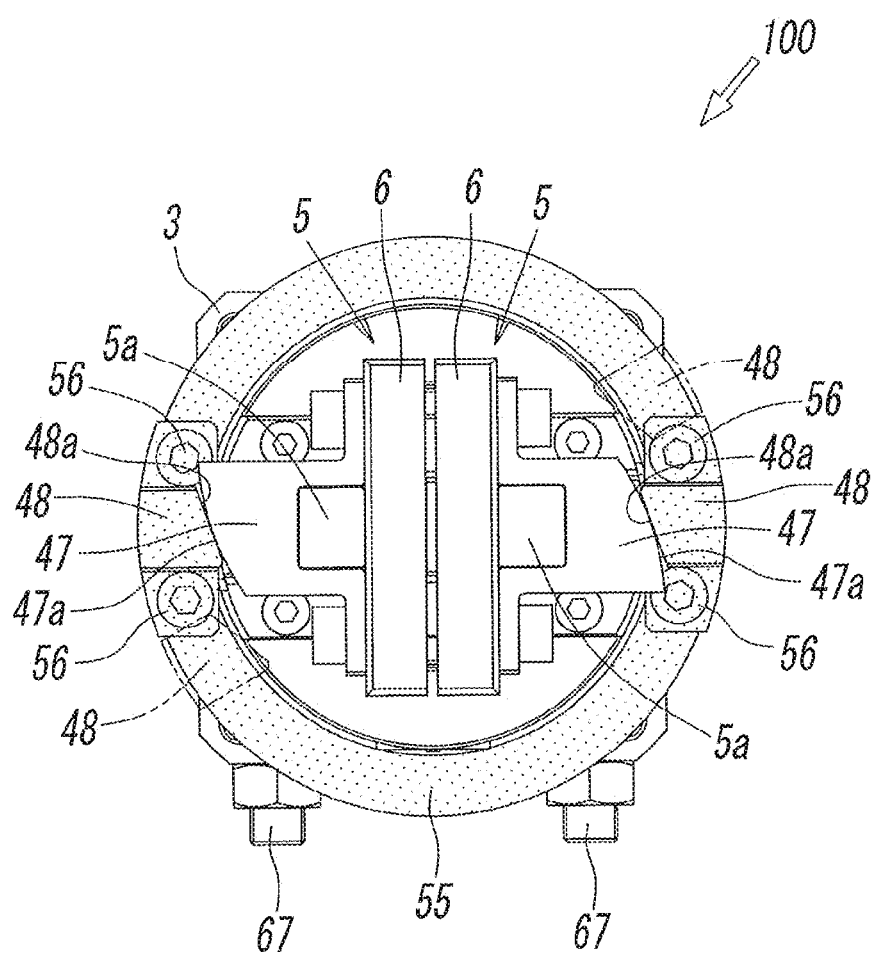
FIG. 4 is a plan view of FIG. 1.
Figure 5:
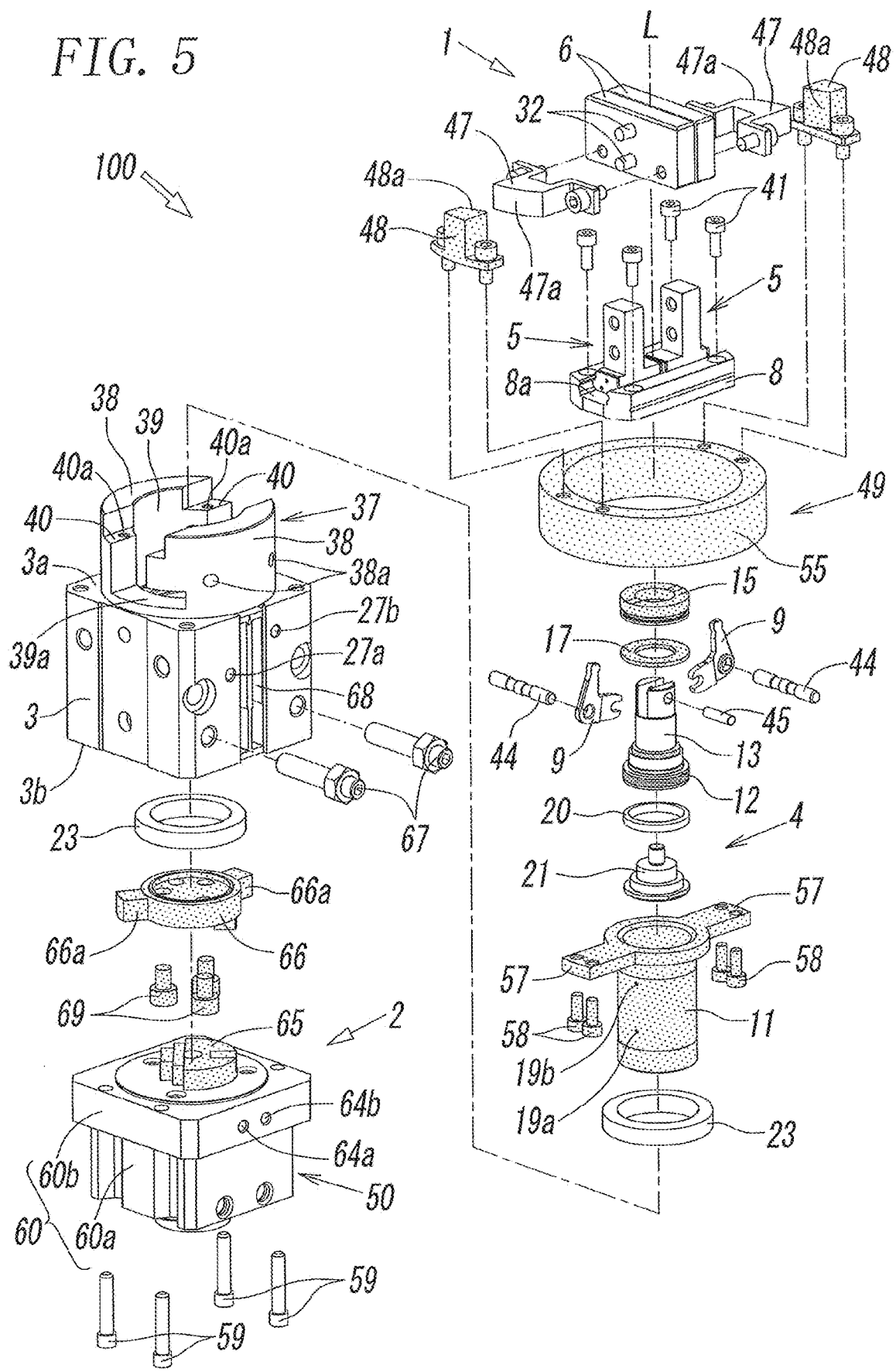
FIG. 5 is an exploded perspective view of FIG. 1.
Figure 6:
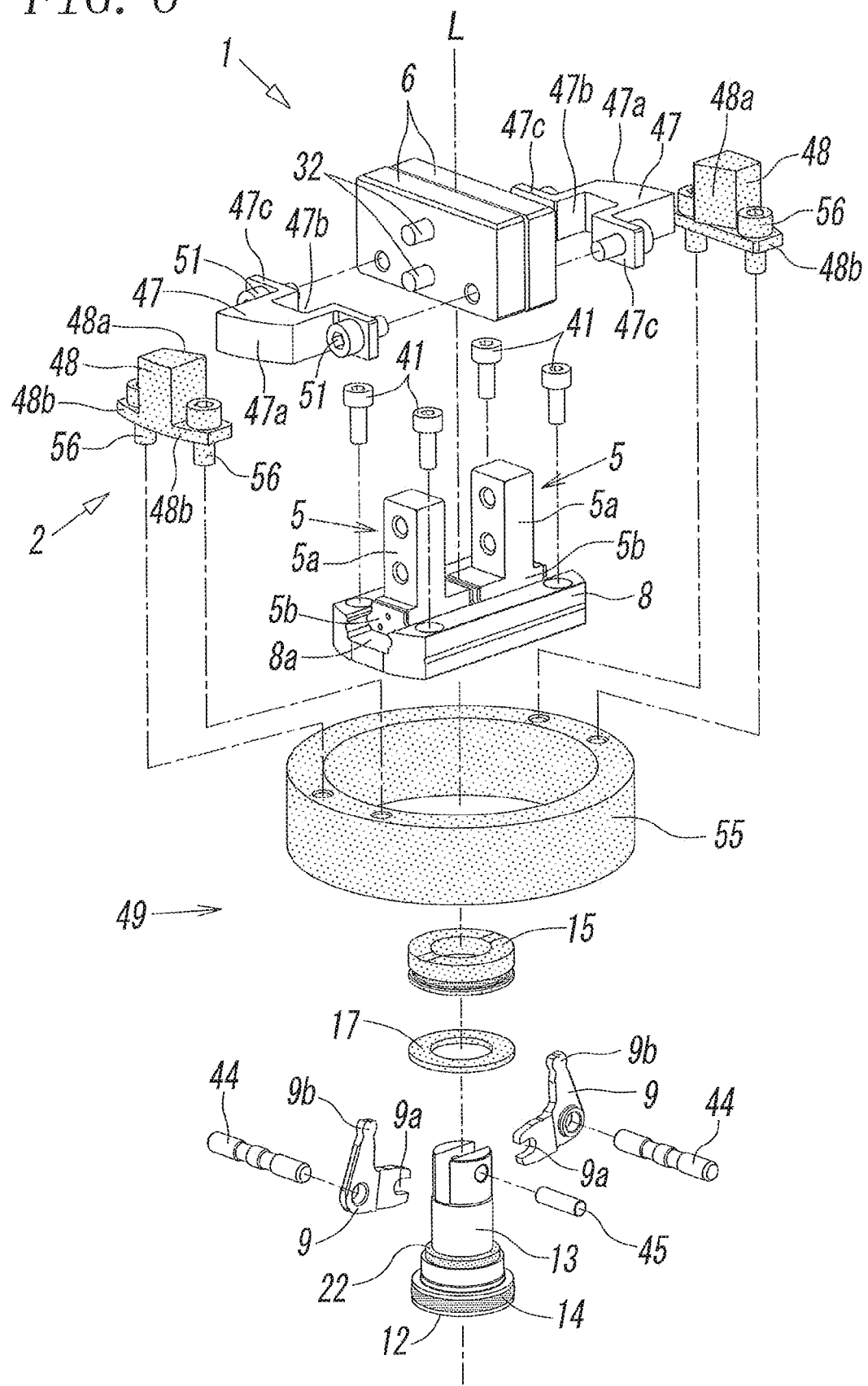
FIG. 6 is an enlarged view of a main part of FIG. 5.
Figure 7:
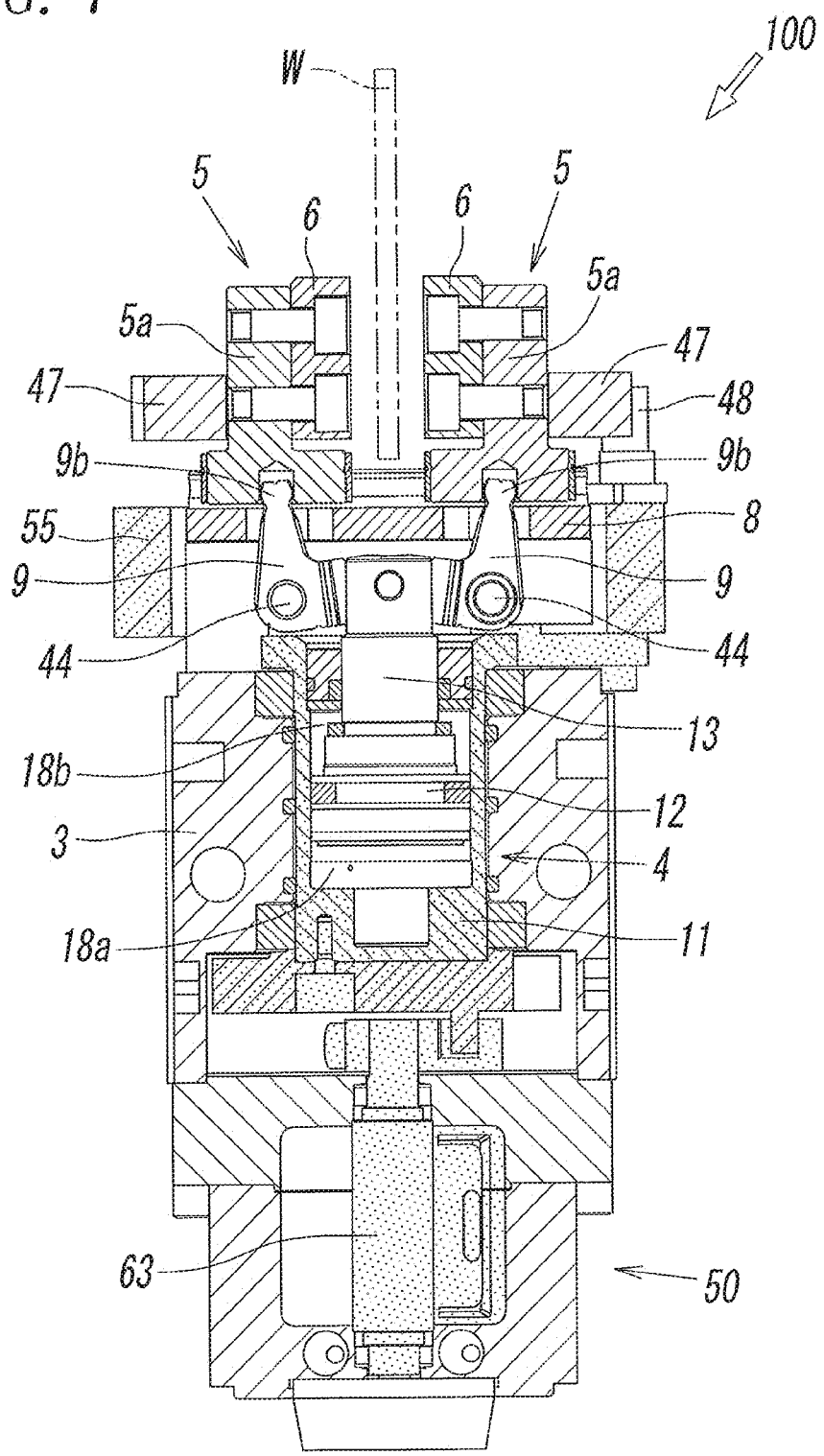
FIG. 7 is a central longitudinal sectional view of the air chuck with the pair of fingers opened.
Figure 8:
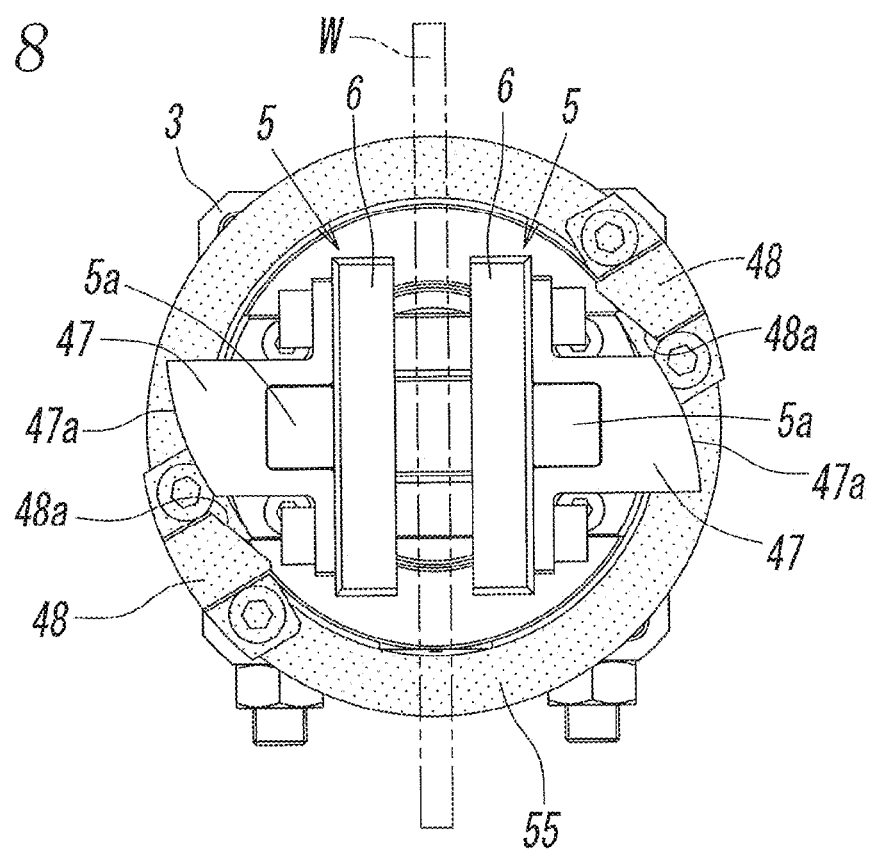
FIG. 8 is a plan view of FIG. 7.

With this structure, as illustrated in FIGS. 2 to 4, when the piston 12 and the rod 13 of the air cylinder device 4 are moved downward, the pair of open/close levers 9, 9 are rotated in a direction in which the engagement portions 9b, 9b at the distal ends are moved close to each other. Thus, the pair of fingers 5, 5 are closed. As illustrated in FIGS. 7 and 8, when the piston 12 and the rod 13 are moved upward, the pair of open/close levers 9, 9 are rotated in a direction in which the engagement portions 9b, 9b at the distal ends are moved away from each other. Thus, the pair of fingers 5, 5 are opened. Through such opening/closing operations of fingers 5, 5, the work W is gripped between the chuck spacers 6, 6 or the gripped work W is released.

Next, the locking mechanism 2 is described. As clearly understood from FIGS. 1 to 6, the locking mechanism 2 includes the pair of first locking members 47, 47, a pair of second locking members 48, 48, a locking-member displacing mechanism 49, and a drive device 50. The pair of first locking members 47, 47 are provided in the pair of fingers 5, 5. The pair of second locking members 48, 48 are brought into contact with or separated from the first locking members 47, 47 when being displaced in a circumferential direction about the axial line L. The locking-member displacing mechanism 49 displaces the second locking members 48, 48 in the circumferential direction. The drive device 50 operates the locking-member displacing mechanism 49. For ease of understanding, in the drawings, the second locking members 48, 48 and components included in the locking-member displacing mechanism 49, that is, components displaced (rotated) integrally with the second locking members 48, 48 are dotted.

The first locking members 47 have recesses 47b and attachment portions 47c. The gripping portions 5a of the fingers 5 are fitted into the recesses 47b. The attachment portions 47c are formed on both sides of each of the recesses 47b. When the attachment portions 47c are secured to the chuck spacers 6 by locking-member securing screws 51 with the gripping portion 5a fitted into the recesses 47b, the pair of first locking members 47 are attached to the pair of fingers 5, 5, respectively. The pair of first locking members 47 are displaced as the pair of fingers 5, 5 are opened/closed. First wedge surfaces 47a are formed on outer surfaces of the first locking members 47, that is, surfaces of the first locking members 47 facing the second locking members 48. The first wedge surfaces 47a are inclined in directions intersecting a displacement direction (circumferential direction) of the second locking members 48 toward the displacement direction.

The second locking members 48 have a square block shape. Second wedge surfaces 48a are formed on inner surfaces of the second locking members 48, that is, surfaces of the second locking members 48 facing the first locking members 47. The second wedge surfaces 48a are inclined in the same directions as those of the first wedge surfaces 47a of the first locking members 47. Although the first wedge surfaces 47a and the second wedge surfaces 48a may be linearly inclined, the first wedge surfaces 47a and the second wedge surfaces 48a are inclined in a gentle convex shape in the illustrated example.

Furthermore, the second locking members 48 are attached by securing attachment portions 48b, by using attachment screws 56, to an upper end of a ring-shaped support member 55 disposed around the rail holder 37 of the chuck body 3 (accordingly, around the pair of fingers 5, 5). The support member 55 is disposed so as to cover a side surface of the space 39, coupled to the cylinder tube 11 of the chuck mechanism 1, and rotated by the cylinder tube 11 in a reciprocating manner in a certain angular range about the axial line L. The positions where the pair of second locking members 48, 48 are attached to the support member 55 are opposite to each other in the diameter direction of the support member 55.

Accordingly, the first wedge surfaces 47a of the first locking members 47 and the second wedge surfaces 48a of the second locking members 48 are inclined in directions intersecting the circumference of the support member 55.

For coupling the support member 55 to the cylinder tube 11, a pair of support-member attachment portions 57, 57 are formed at an upper end portion of the cylinder tube 11. The support-member attachment portions 57, 57 are positioned so as to be opposite to each other in the diameter direction of the cylinder tube 11 and extend in directions away from the axial line L. Distal end portions of the support-member attachment portions 57 project to the outside of the rail holder 37 through cuts for swinging 39a formed in the rail holder 37. The support member 55 is secured to distal ends of the support-member attachment portions 57 by support-member securing screws 58.

With this structure, the cylinder tube 11 is rotated in one direction to rotate the support member 55 about the axial line L by a predetermined angle, thereby, as indicated by solid lines illustrated in FIG. 4, the second wedge surfaces 48a, 48a of the second locking members 48, 48 are brought into contact with and retained at, in a wedging manner, the first wedge surfaces 47a, 47a of the first locking members 47, 47. Thus, the pair of fingers 5, 5 are locked at these positions and unable to be opened. At this time, due to a wedging effect obtained by contact of the first wedge surfaces 47a with the second wedge surfaces 48a, a boosting action is exerted so as to significantly increase a holding force for the locking.

The distal end of the rod 13 is substantially coupled to the pair of open/close levers 9, 9 by the engagement pin 45. During the rotation of the cylinder tube 11, since the open/close levers 9, 9 are not rotated, the rod 13 is not rotated together with the cylinder tube 11. The components that are rotated at this time together with the cylinder tube 11 are the rod cover 15, the rod packing 16, and the packing support 17.

When the cylinder tube 11 is rotated in the opposite direction to rotate the support member 55 in the opposite direction, as indicated by chain lines illustrated in FIG. 4, the second locking members 48, 48 are separated from the first locking members 47, 47. Thus, the locking of the pair of fingers 5, 5 is release, and the fingers 5, 5 can be opened.

The cylinder tube 11 is coupled to the drive device 50 attached to a second end 3b side of the chuck body 3, which is a lower end of the chuck body 3, by screws 59 and rotated in a swinging manner by the drive device 50.

The drive device 50 includes a vane-type swinging actuator. This swinging actuator includes an actuator body 60, a vane chamber 61, a vane 62, and an output shaft 63. The actuator body 60 includes a first body portion 60a and a second body portion 60b. The vane chamber 61 is formed in the actuator body 60. The vane 62 is accommodated in the vane chamber 61 such that the vane 62 is swingable in a certain angular range. The output shaft 63 is disposed on the axial line L. The vane 62 is attached to the output shaft 63. The actuator body 60 has a third port 64a and a fourth port 64b for supplying and discharging the compressed air to pressure chambers on both sides of the vane 62. When the compressed air is supplied to and discharged from the pressure chambers through the third port 64a and the fourth port 64b, the vane 62 is rotated in a reciprocating manner in a certain angular range about the axial line L. The force of this rotation is extracted through the output shaft 63.

The output shaft 63 is coupled to the cylinder tube 11 by using a coupling member 65 attached to the output shaft 63 and an adjusting member 66 retained at the coupling member 65. The output shaft 63 drives and rotates the cylinder tube 11 through the coupling member 65 and the adjusting member 66. Accordingly, the coupling member 65, the adjusting member 66, the cylinder tube 11, and the support member 55 are included in the locking-member displacing mechanism 49.

Members denoted by reference sign 69 in the drawings are coupling screws by which the adjusting member 66 is coupled to a bottom surface of the cylinder tube 11. Likewise, members denoted by reference sign 59 are the attachment screws by which the second body portion 60b of the actuator body 60 is attached to the lower end of the chuck body 3.

The adjusting member 66 is for setting and adjusting the rotation angle of the cylinder tube 11 (accordingly, the support member 55 and the second locking members 48) and has two stopper levers 66a, 66a. Correspondingly, two adjusting bolts 67, 67 are attached to the chuck body 3 such that the adjusting bolts 67, 67 can be advanced/retracted. Distal ends of the two adjusting bolts 67, 67 face the two stopper levers 66a, 66a, respectively. Thus, the cylinder tube 11 can be rotated in a reciprocating manner within an angular range set by contact of the two stopper levers 66a, 66a with the two adjusting bolts 67, 67. The rotation angle can be adjusted by advancing/retracting the adjusting bolts 67, 67.

Furthermore, a sensor attachment groove 68 for attachment of a magnetic sensor is formed in the side surface of the chuck body 3. When magnetism of the magnet 20 attached to the piston 12 of the cylinder device is detected by the magnetic sensor, operating position of the piston 12 can be detected.

The air chuck 100 having the above-described structure is used in such a case where, for example, the chuck body 3 is attached to a work arm of an automatic machine, and the work W is gripped by the pair of fingers 5, 5, so that the work W is, for example, redirected or transported to another location. At this time, the air cylinder device 4 of the chuck mechanism 1 and the drive device 50 of the locking mechanism 2 are connected to different air pressure sources. The work W is gripped and released by the air chuck 100 as follows.

First, from a state illustrated in FIGS. 2 to 4, the vane 62 of the drive device 50 is rotated counterclockwise in FIG. 4 by action of the compressed air, thereby rotating the support member 55 in the same direction through the cylinder tube 11. In this way, the second locking members 48, 48 are displaced to the chain-line positions where the second locking members 48, 48 are separated from the first locking members 47, 47. Then, as illustrated in FIGS. 7 and 8, the compressed air is supplied into the first pressure chamber 18a of the cylinder tube 11 so as to move the piston 12 and the rod 13 upward. In this way, the pair of fingers 5, 5 are opened.

Next, as indicated by a chain line illustrated in FIG. 8, the work W to be gripped is disposed between the chuck spacers 6, 6 of the pair of fingers 5, 5. In this state, the compressed air is supplied into the second pressure chamber 18b of the cylinder tube 11 so as to move the piston 12 and the rod 13 downward, thereby the fingers 5, 5 are closed. In this way, as illustrated in FIG. 9, the work W is gripped between the chuck spacers 6, 6.

Figure 9:
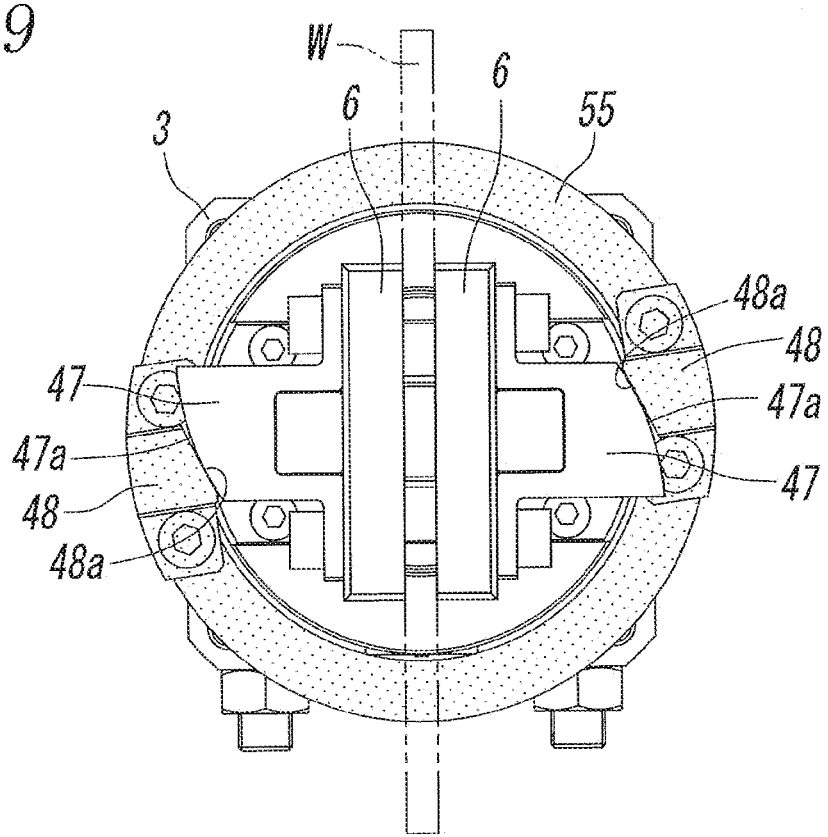
FIG. 9 is a plan view of the air chuck with the pair of fingers locked at work grip positions.

Then, the vane 62 of the drive device 50 is rotated by the action of the compressed air to rotate clockwise, through the cylinder tube 11, the second locking members 48, 48 and the support member 55 at the positions illustrated in FIG. 8, thereby, as illustrated in FIG. 9, the second wedge surfaces 48a, 48a of the second locking members 48, 48 are brought into contact with, in a wedging manner, the first wedge surfaces 47a, 47a of the first locking members 47, 47. As a result, the pair of fingers 5, 5 are locked at the work grip positions by the second locking members 48, 48 and unable to be opened.

Thus, while the fingers 5, 5 are locked at the work grip positions, an operation such as redirecting the work W or transporting the work W to the other location is performed by operating the work arm. At this time, even when the supply of the compressed air to the chuck mechanism 1, that is, the air cylinder device 4 is stopped for some reason, a state in which the pair of fingers 5, 5 grip the work W is maintained as it is without reduction of the gripping force. Thus, misalignment of the work W, dropping of the work W, or the like is prevented. Accordingly, damage to the work W or devices around the work W due to the dropping of the work W is prevented, thereby the safety of an operator is ensured.

When releasing the work W gripped by the air chuck 100, first, the support member 55 is rotated counterclockwise from the state illustrated in FIG. 9 by the drive device 50 through the cylinder tube 11, thereby displacing the second locking members 48, 48 to the positions separated from the first locking members 47, 47 (see FIG. 8). Thus, the locking of the fingers 5, 5 is released. Next, as illustrated in FIGS. 7 and 8, the rod 13 of the air cylinder device 4 is moved upward so as to open the fingers 5, 5. Thus, the work W is released.

Since the second wedge surfaces 48a, 48a of the second locking members 48, 48 and the first wedge surfaces 47a, 47a of the first locking members 47, 47 are inclined, the air chuck 100 can be used for the work W having a different thickness. In this case, when gripping the work W having a larger thickness than that of the work W illustrated in FIG. 9, the degree of engagement between the second wedge surfaces 48a of the second locking members 48 and the first wedge surfaces 47a of the first locking members 47 is smaller than that in the case of FIG. 9. In contrast, when gripping the work W having a smaller thickness than that of the work W illustrated in FIG. 9, the degree of engagement between the second wedge surfaces 48a of the second locking members 48 and the first wedge surfaces 47a of the first locking members 47 is larger than that in the case of FIG. 9.

FIGS. 10 to 16 illustrate a second embodiment of the air chuck provided with a locking mechanism according to the present invention. In the air chuck 100 according to the above-described first embodiment, out of the first locking members 47, 47 and the second locking members 48, 48, second locking members 48, 48 are rotated to lock the pair of fingers 5, 5 at the work grip positions. However, in an air chuck 200 according to the second embodiment, the first locking members 47, 47 are rotated.

Figure 10:
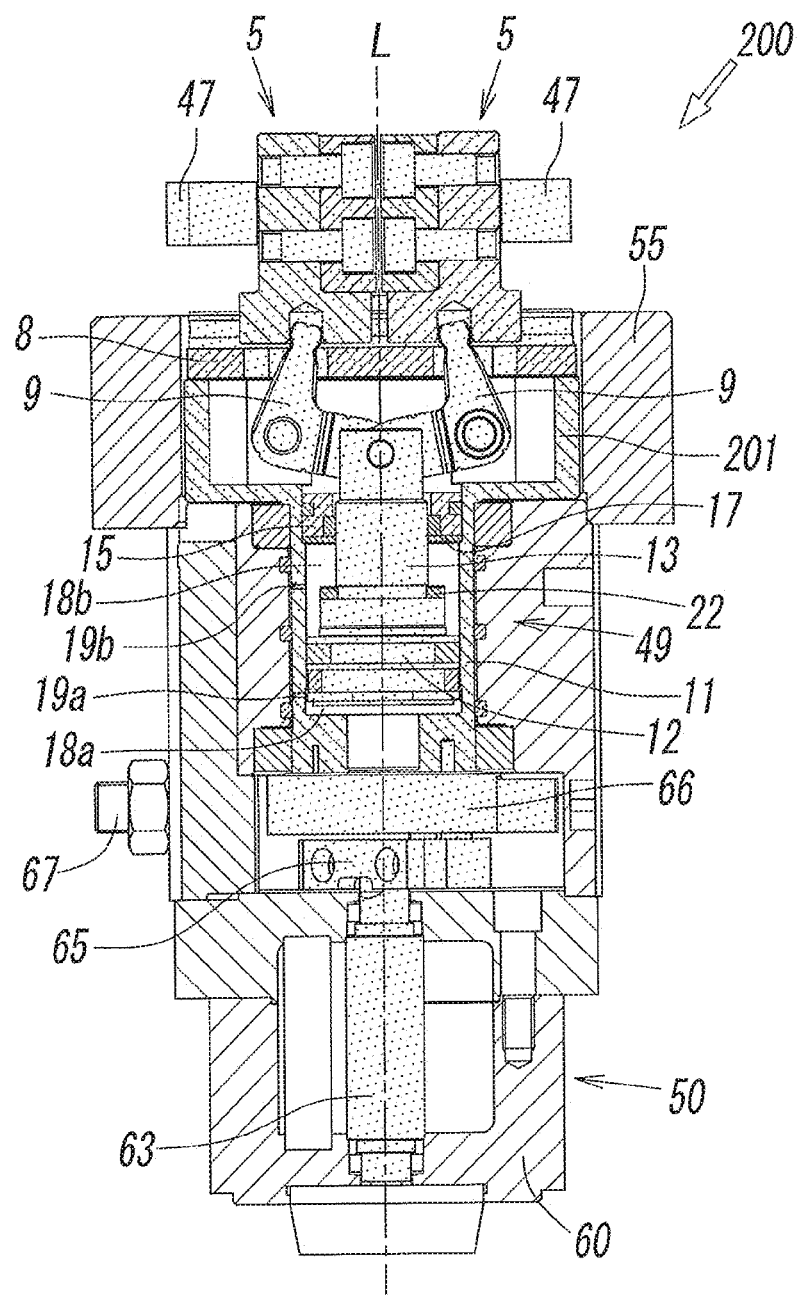
FIG. 10 is a central longitudinal sectional view of a second embodiment of an air chuck according to the present invention with the pair of fingers closed.
Figure 11:
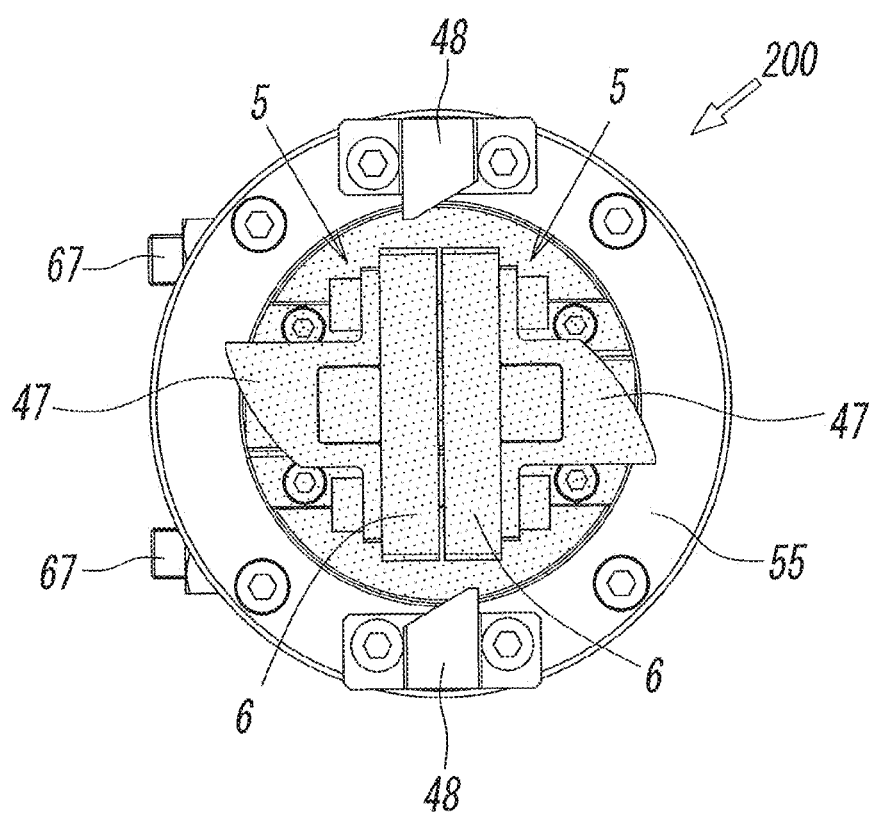
FIG. 11 is a plan view of FIG. 10.
Figure 12:
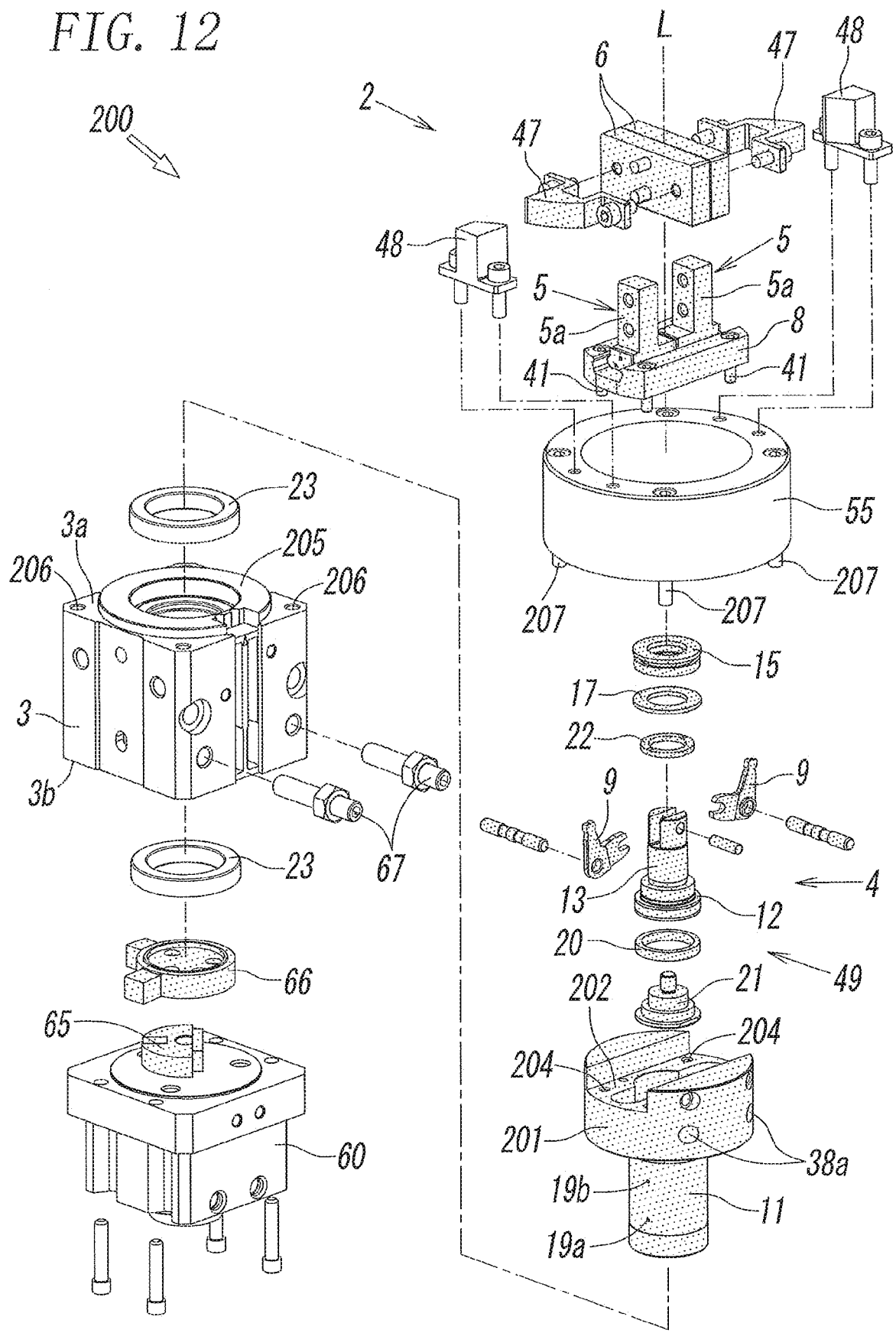
FIG. 12 is an exploded perspective view of the air chuck according to the second embodiment.

Accordingly, in the air chuck 200, as illustrated in FIGS. 10 to 12, the fingers 5, 5 to which the first locking members 47, 47 are attached are coupled to the cylinder tube 11 with the support rail 8 interposed therebetween, thereby the cylinder tube 11 rotates the support rail 8 and the fingers 5, 5. Thus, the first locking members 47, 47 are rotated, and the support member 55 to which the second locking members 48, 48 are attached is secured to the chuck body 3.

Furthermore, the air cylinder device 4 is provided with a structure to prevent rotation of the cylinder tube 11 and the piston 12 so that, when the fingers 5, 5 and the support rail 8 are rotated, the open/close levers 9, 9, the rod 13, and the piston 12 can be rotated together with the fingers 5, 5 and the support rail 8. Thus, the cylinder tube 11 and the piston 12 are integrated and are not rotated relative to each other in the rotation direction about the axial line L, but the cylinder tube 11 and the piston 12 can be relatively displaced in the axial line L direction.

Hereinafter, the structures and operations according to the second embodiment are described. In this description, components common to the first embodiment are denoted by the same reference signs as those of the first embodiment, and structures different from those of the first embodiment are denoted by new reference signs.

Also, in the drawings for the second embodiment, for ease of understanding, components displaced (rotated) integrally with the first locking members 47, 47 are dotted.

A rail holder 201 is formed at the upper end portion of the cylinder tube 11. The rail holder 201 has a cylindrical shape having a larger diameter than that of the cylinder tube 11. A step portion 202 extending in the diameter direction of the rail holder 201 is formed at an upper end portion of the rail holder 201. The support rail 8 is secured to the cylinder tube 11 by placing the support rail 8 on the step portion 202 and screwing the rail securing screws 41, which are inserted through screw insertion holes of the support rail 8, into screw holes 204 of the step portion 202. The width and depth of the step portion 202 are substantially the same as the width and height of the support rail 8.

Although the above-described rail holder 201 is integrally formed with the cylinder tube 11, the rail holder 201 may be separately formed from the cylinder tube 11 and attached to the cylinder tube 11 by screws.

Furthermore, a ring-shaped fitting portion 205 to be fitted into the support member 55 is formed at the center of the first end 3a of the chuck body 3, which is the upper end of the chuck body 3, and four screw holes 206 are formed at four corners of the first end 3a. The support member 55 is secured to the chuck body 3 by placing the support member 55 on the first end 3a such that the support member 55 is positioned through fitting of the fitting portion 205 and screwing securing screws 207, which are inserted through screw insertion holes of the support member 55, into the screw holes 206.

The structures of the air chuck 200 other than the above description are substantially the same as the structures of the air chuck 100 according to the first embodiment. Accordingly, in the structures, main parts of the structures that are the same as those of the first embodiment are denoted by the same reference signs as those of the first embodiment, thereby omitting description thereof.

In the air chuck 200 having the above-described structure, when gripping the work with the pair of fingers 5, 5, as illustrated in FIGS. 10 and 11, the cylinder tube 11 is rotated about the axial line L by the drive device 50, thereby orienting the fingers 5, 5 so that the fingers 5, 5 occupy positions at which the first locking members 47, 47 are not in contact with the second locking members 48, 48. At this time, the piston 12, the rod 13, and the open/close levers 9, 9 are also rotated together with the cylinder tube 11. Although the fingers 5, 5 are oriented such that the first locking members 47, 47 occupy positions spaced from the second locking members 48, 48 by 90 degrees in the illustrated example, the orientations of the fingers 5, 5 are not limited to these.

Figure 13:
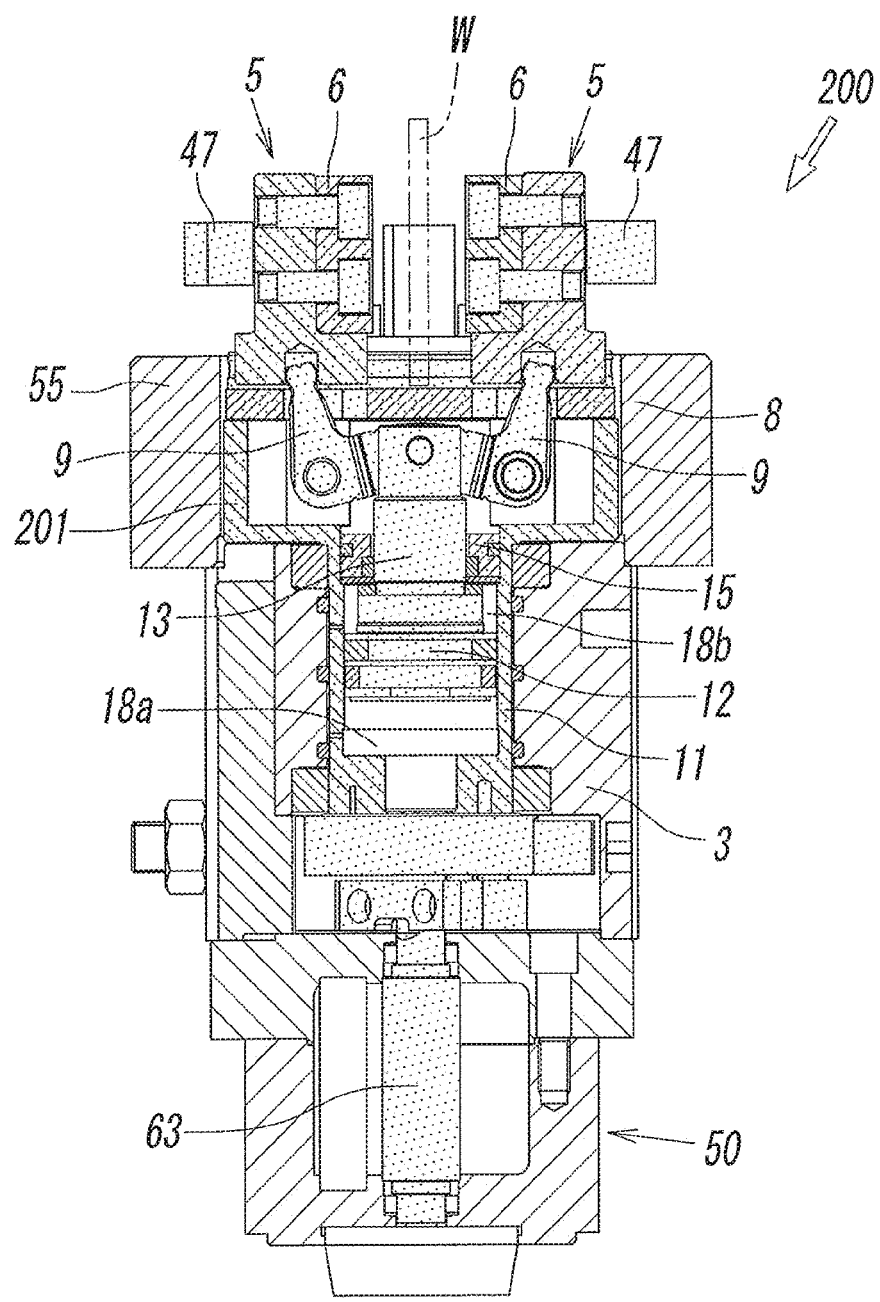
FIG. 13 is a central longitudinal sectional view of the second embodiment with the pair of fingers opened.
Figure 14:
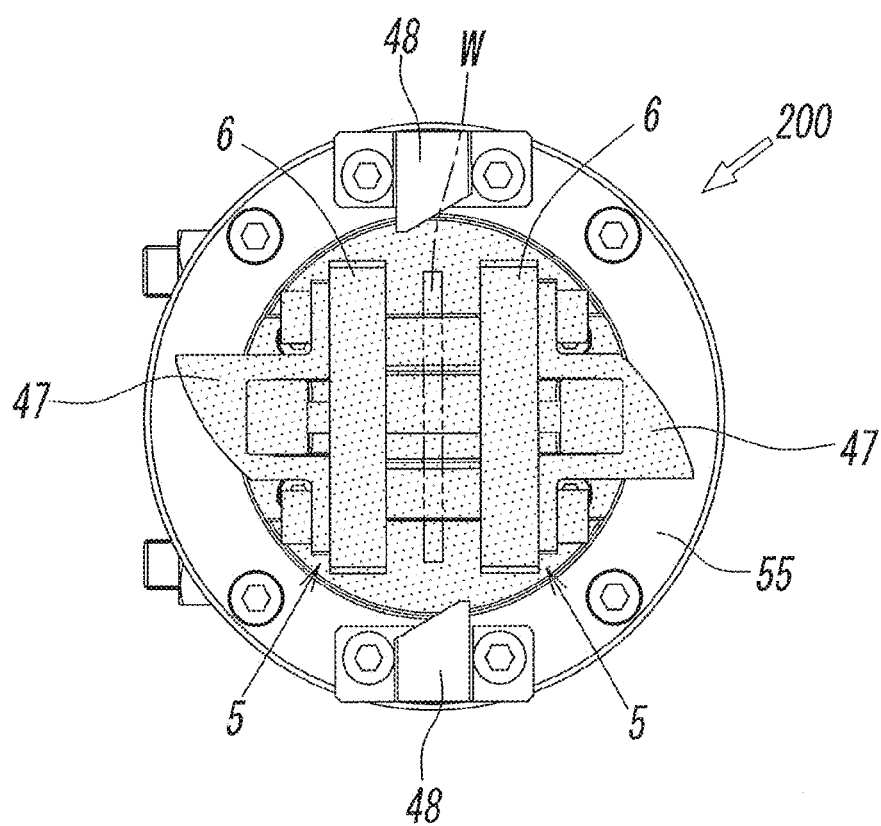
FIG. 14 is a plan view of FIG. 13.

Then, when the compressed air is supplied into the first pressure chamber 18a of the cylinder tube 11 so as to move the piston 12 and the rod 13 upward, the pair of fingers 5, 5 are opened as illustrated in FIGS. 13 and 14.

Next, in a state in which the work W is interposed between the chuck spacers 6, 6 of the pair of fingers 5, 5, the compressed air is supplied into the second pressure chamber 18b of the cylinder tube 11 so as to move the piston 12 and the rod 13 downward, thereby the fingers 5, 5 are closed so as to grip the work W.

Figure 15:
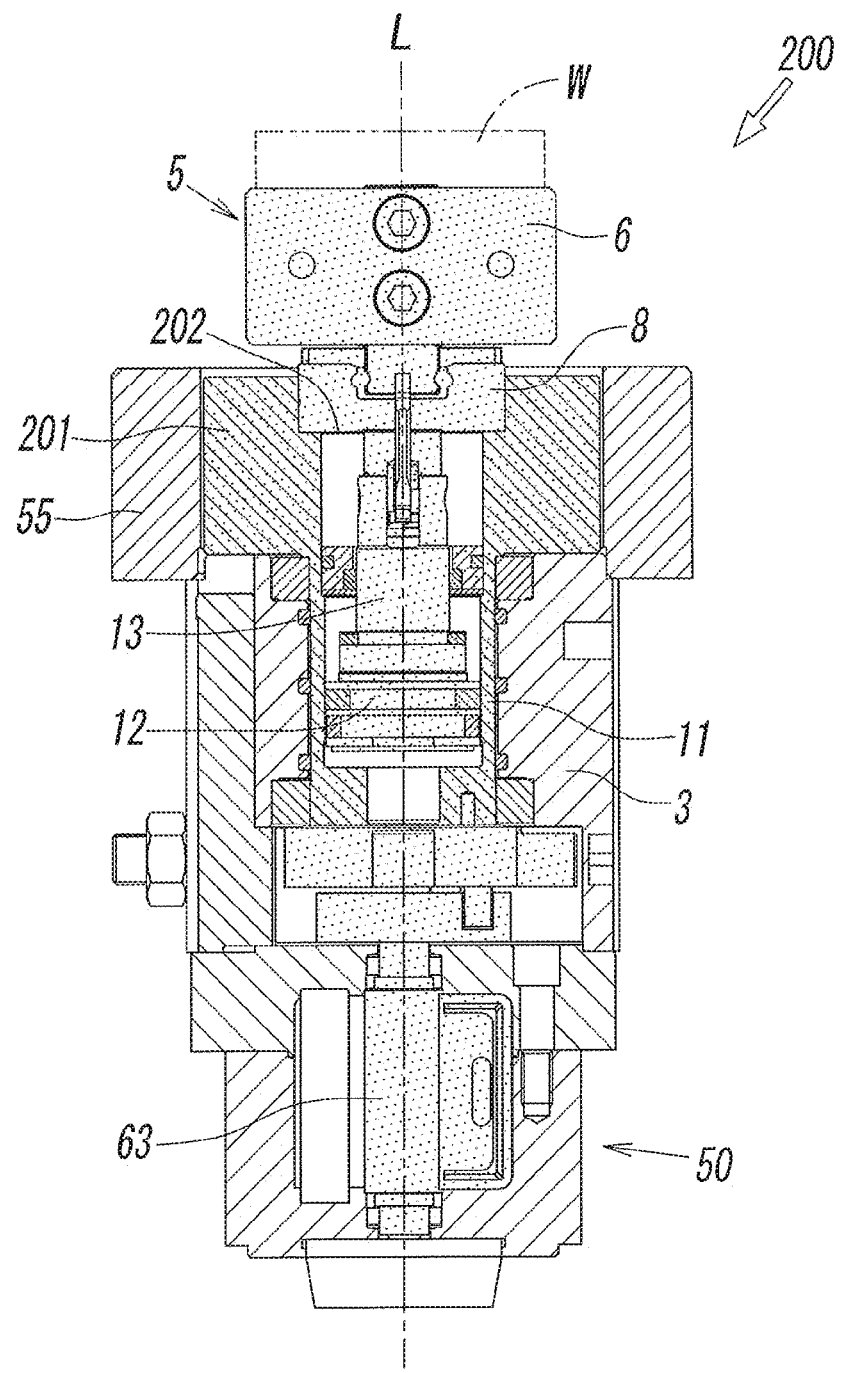
FIG. 15 is a central longitudinal sectional view of the second embodiment with the pair of fingers locked at the work grip positions.
Figure 16:
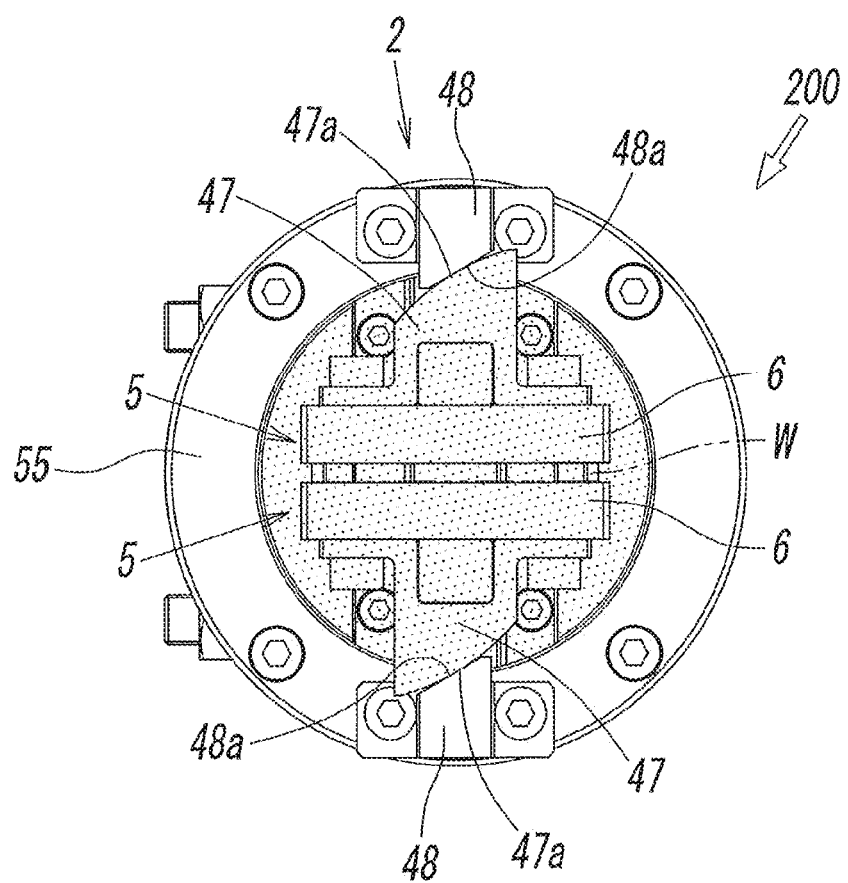
FIG. 16 is a plan view of FIG. 15.
Figure 17:
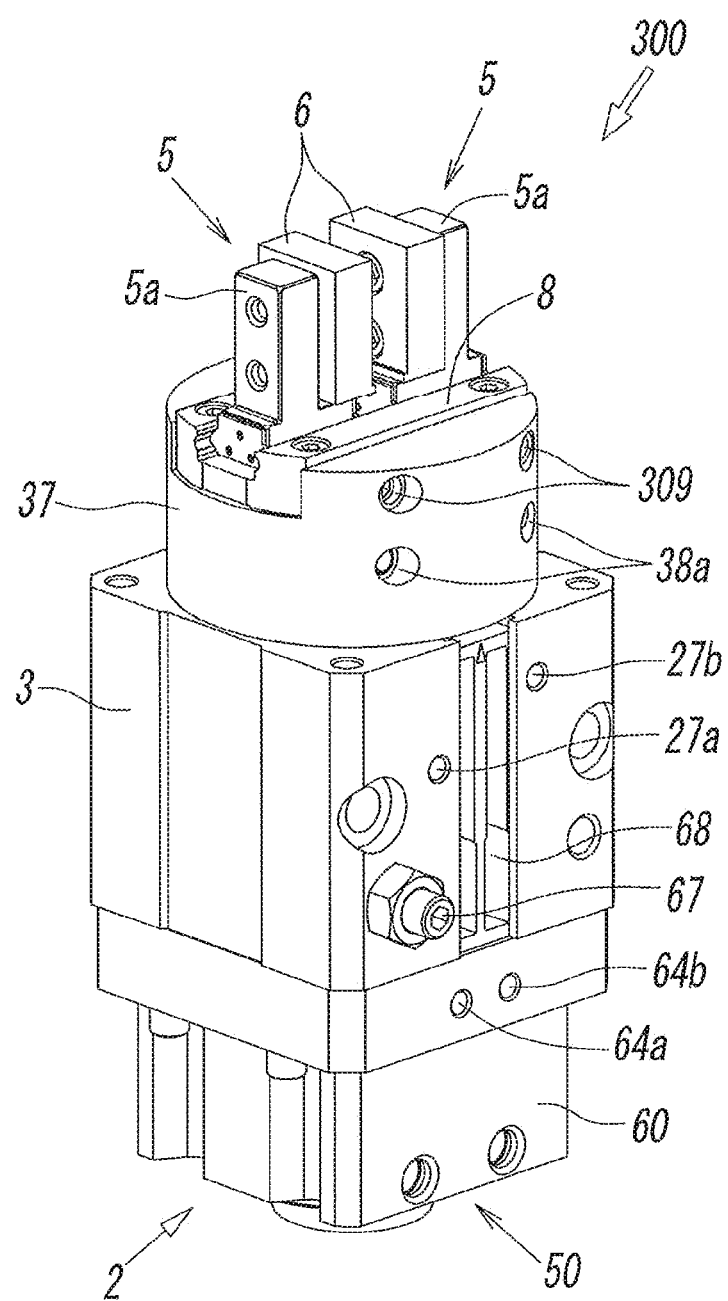
FIG. 17 is a perspective view of a third embodiment of the air chuck.

Then, as illustrated in FIGS. 15 and 16, the cylinder tube 11 is rotated about the axial line L by the drive device 50 so as to bring the first wedge surfaces 47a, 47a of the first locking members 47, 47 into contact with, in a wedging manner, the second wedge surfaces 48a, 48a of the second locking members 48, 48. Thus, the fingers 5, 5 are locked at the work grip positions.

The work W gripped by the fingers 5, 5 can be released in reverse order of the above-described operations performed when gripping the work W.

Since the air chuck 200 according to the second embodiment is operated as described above, it can be said that, according to the second embodiment, the locking-member displacing mechanism 49 for displacing the first locking members 47, 47 includes the coupling member 65, the adjusting member 66, the air cylinder device 4, the open/close levers 9, 9, the support rail 8, the fingers 5, 5, and the chuck spacers 6, 6.

FIGS. 17 to 27 illustrate a third embodiment of the air chuck provided with a locking mechanism according to the present invention. Main differences between an air chuck 300 according to the third embodiment and the air chuck 100 according to the first embodiment are shapes and arrangement of the first locking members 47 and the second locking members 48. That is, in the air chuck 300 according to the third embodiment, a first locking member 47 has a shaft shape and is attached to the rod 13 that opens/closes the pair of fingers 5, 5, and the second locking members 48, 48 have such a hook shape that the second locking members 48, 48 can be retained at the shaft-shaped first locking member 47 and are directly attached to the cylinder tube 11.

Regarding this, the ring-shaped support member 55 required to attach the second locking members 48 in the air chuck 100 according to the first embodiment is omitted from the air chuck 300 according to the third embodiment. Also, the cuts for swinging 39a formed in the rail holder 37 holding the support rail 8 in the air chuck 100 according to the first embodiment are omitted from the rail holder 37 of the air chuck 300 according to the third embodiment.

Hereinafter, the structures and operations of the air chuck 300 according to the third embodiment are described. In so doing, main portions and components having the substantially the same structures as those of the air chuck 100 according to the first embodiment are denoted by the same reference signs as those of the first embodiment, thereby omitted specific description thereof. Portions and components having structures different from those of the first embodiment are denoted by new reference signs and described.

Also, in the drawings for the third embodiment, for ease of understanding, components displaced (rotated) integrally with the cylinder tube 11 are dotted.

Figure 18:
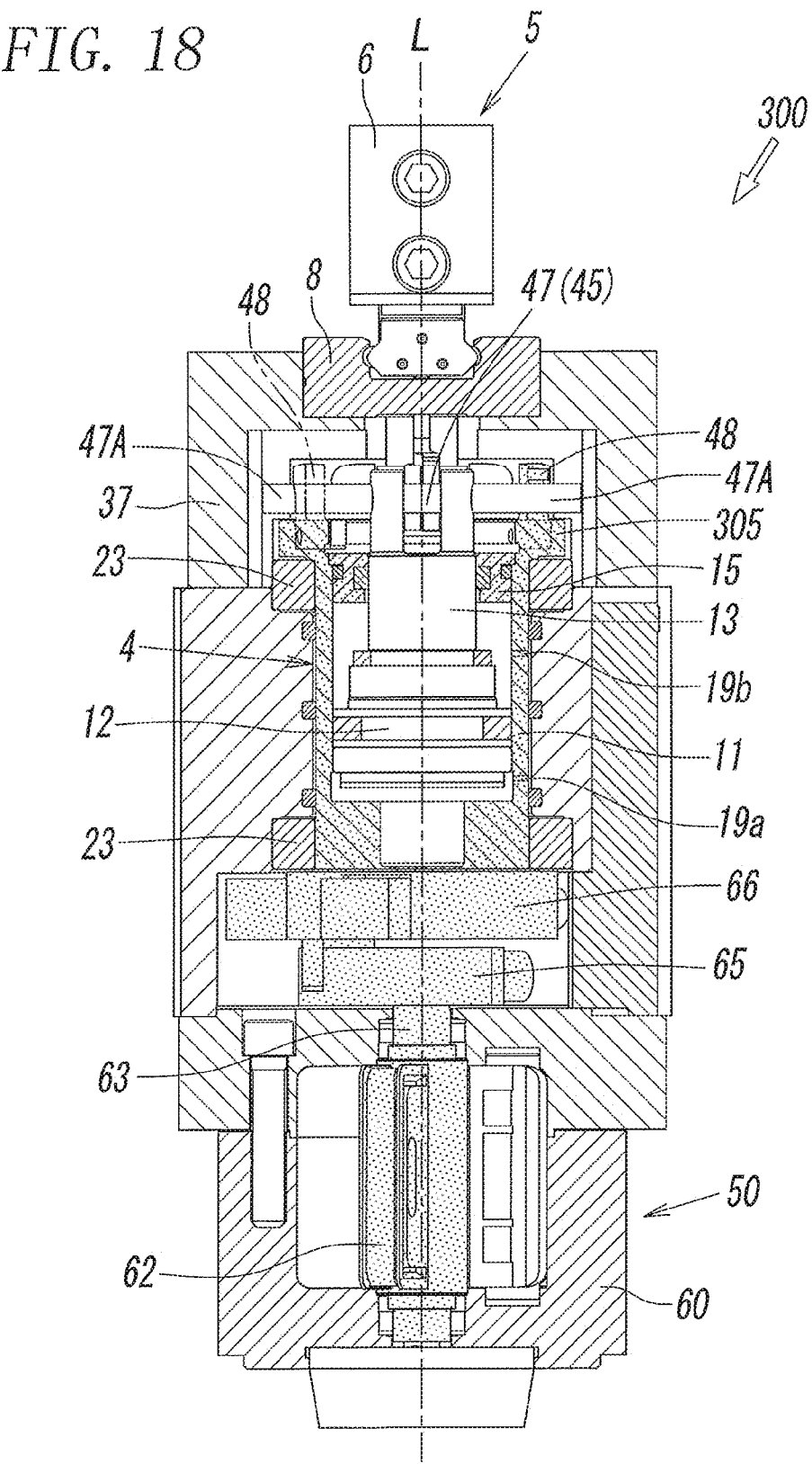
FIG. 18 is a central longitudinal sectional view of FIG. 17.
Figure 19:
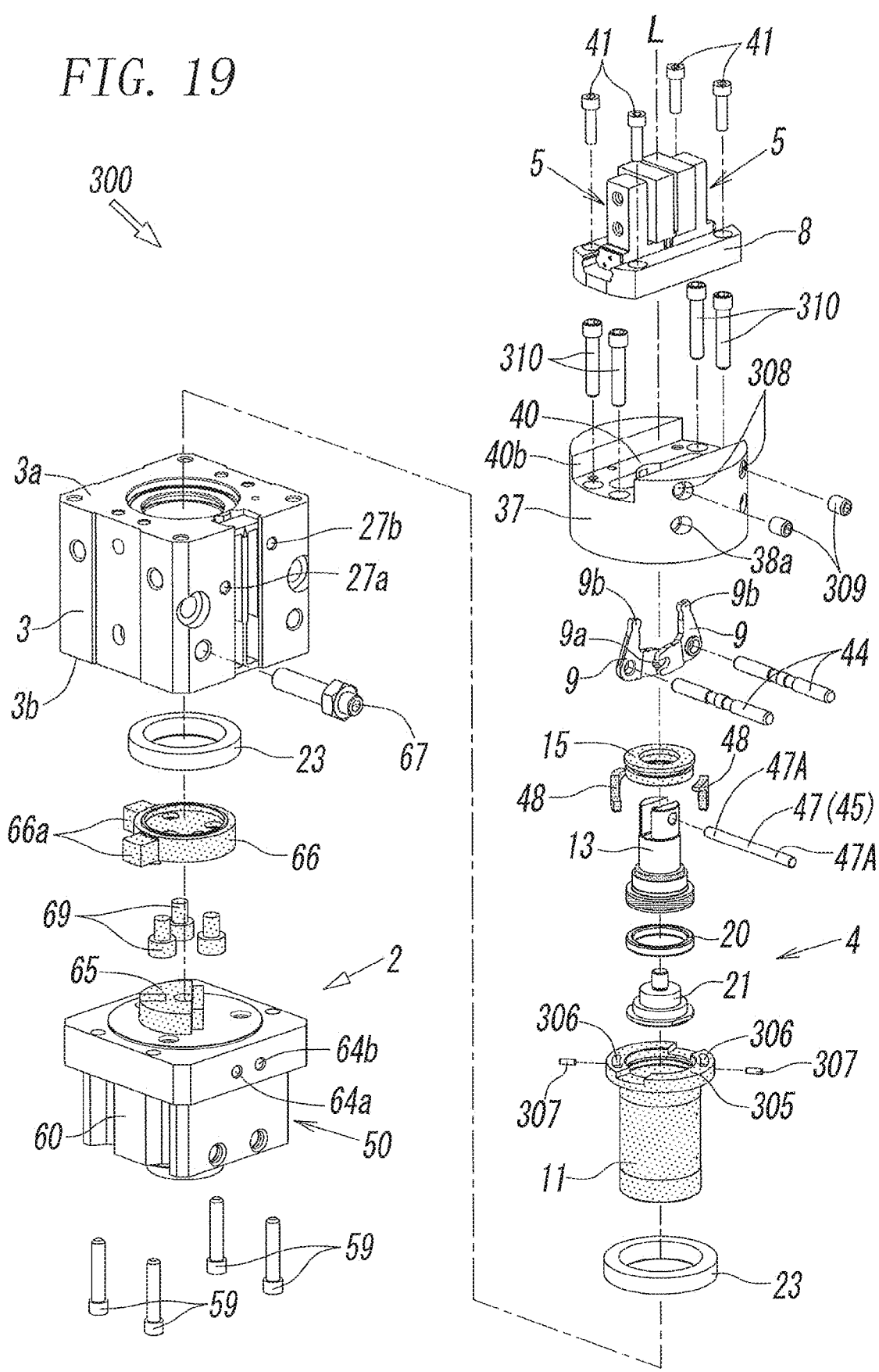
FIG. 19 is an exploded perspective view of the air chuck according to the third embodiment.

As clearly understood from FIGS. 18 and 19, a first locking member 47 is formed by the engagement pin 45 through which the rod 13 and the pair of open/close levers 9, 9 are coupled to one another. That is, the first locking member 47 has a shaft shape having a circular shape in section, extends in a direction perpendicular to the axial line L, and also serves as the engagement pin 45. Furthermore, the length of the first locking member 47 is larger than the diameter of the cylinder tube 11, and both ends of the first locking member 47 project outward from the outer circumference of the cylinder tube 11. Retaining portions 47A at which the second locking members 48, 48 are retained are formed in these projected end portions of the first locking member 47. Both the end portions of the first locking member 47 are fitted into guide grooves 37a (see FIG. 24) formed in an inner surface of the rail holder 37 such that the first locking member 47 can be displaced in the axial line L direction and is fixed with respect to the rotation direction about the axial line L.

Figure 20:
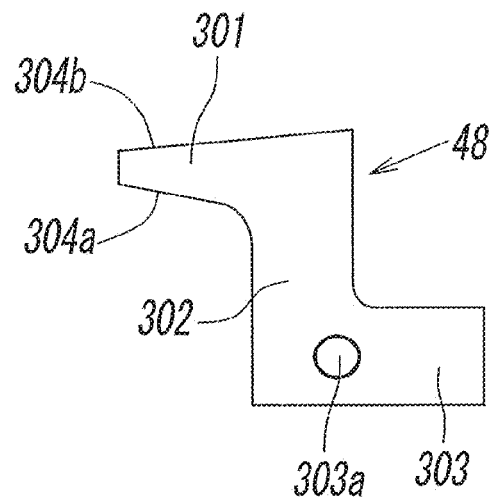
FIG. 20 is a side view of a second locking member.
Figure 21:
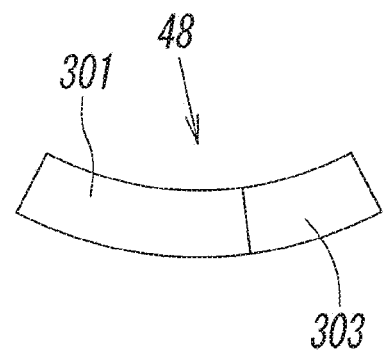
FIG. 21 is a plan view of the second locking member.

Meanwhile, as illustrated in detail in FIGS. 20 and 21, each of the second locking members 48 has a substantially Z shape in side view and includes a claw portion 301, a leg portion 302, and a leg base portion 303. The claw portion 301 is to be retained at and separated from a corresponding one of the retaining portions 47A. The leg portion 302 extends downward (in the longitudinal direction) from a proximal end portion of the claw portion 301. The leg base portion 303 is a thin elongated portion laterally extending from a lower end portion of the leg portion 302. The second locking member 48 is generally curved along the circumference of the cylinder tube 11.

The claw portion 301 extends in a direction intersecting the first locking member 47 (lateral direction) and has wedge surfaces 304a, 304b at its lower and upper surfaces. Out of these, the lower wedge surface 304a formed at the lower surface is gradually inclined upward, that is, in a direction approaching the upper wedge surface 304b toward a distal end of the claw portion 301, and the upper wedge surface 304b formed at the upper surface is gradually inclined downward, that is, in a direction approaching the lower wedge surface 304a toward the distal end of the claw portion 301.

Two second locking members 48 are attached to the upper end portion of the cylinder tube 11 so as to correspond to the retaining portions 47A, 47A at both the ends of the first locking member 47. The two second locking members 48, 48 have the same shape and are oriented in the same direction with the distal ends of the claw portions 301 directed toward the circumferential direction of the cylinder tube 11. For attaching the second locking members 48, a flange-shaped attachment portion 305 is formed at the upper end portion of the cylinder tube 11 so as to outwardly project from the cylinder tube 11 in the diameter direction, and two elongated groove-shaped attachment grooves 306 curved along the circumference of the attachment portion 305 are formed at positions of an upper surface of the attachment portion 305 opposite to each other with the axial line L interposed therebetween. The second locking members 48 are secured to the cylinder tube 11 by fitting the leg base portion 303 into the attachment grooves 306 and inserting, from side surface directions of the attachment portion 305, securing pins 307 into the attachment portion 305 and securing holes 303a formed in the leg base portions 303.

Differences between the air chuck 300 according to the third embodiment and the air chuck 100 according to the first embodiment are, other than the above description are that the rail holder 37 is secured to the first end 3a of the chuck body 3 with holder securing screws 310, and, when the support rail 8 supporting the fingers 5, 5 is secured to a step portion 40 of the rail holder 37 by the rail securing screws 41, the support rail 8 is secured while accurately positioned by attaching positioning screws 309 into screw holes 308 in a side surface of the rail holder 37 and pressing, by using the positioning screws 309, the support rail 8 against a side surface 40b of the step portion 40.

The other difference is that lock release positions of the second locking members 48 are adjusted by attaching a single adjusting bolt 67 to the chuck body and adjusting a rotation angular range of the adjusting member 66 by using the single adjusting bolt 67.

The structures of the air chuck 300 other than the above description are substantially the same as the structures of the air chuck 100 according to the first embodiment.

The structures related to the positioning screws 309 and the single adjusting bolt 67 in the air chuck 300 according to the third embodiment can also be applied to the air chuck 100 according to the first embodiment and the air chuck 200 according to the second embodiment.

Figure 22:
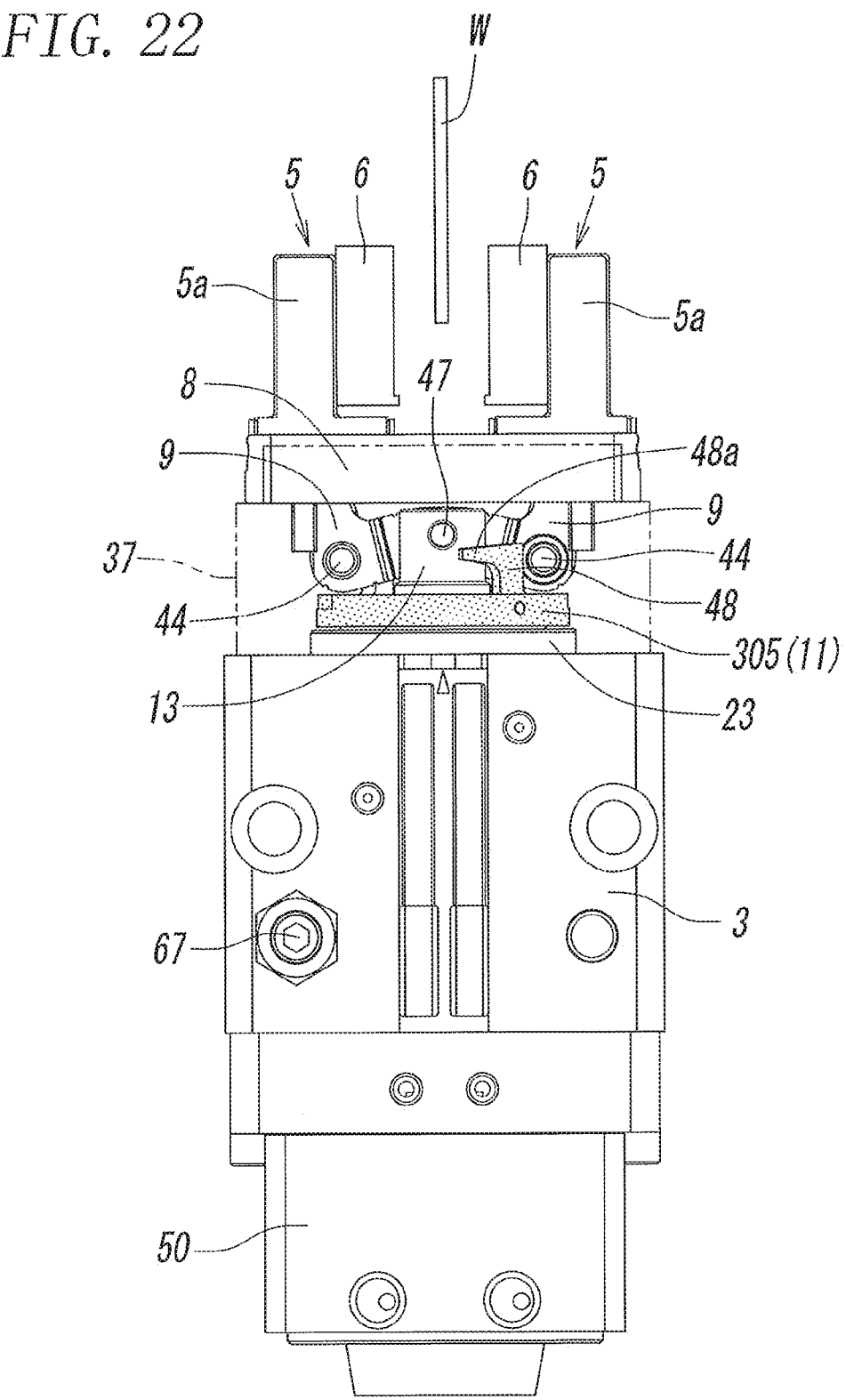
FIG. 22 is a side view of the air chuck with the pair of fingers opened and a rail holder omitted.

Next, operations of the air chuck 300 are described. FIG. 22 illustrated a state in which the pair of fingers 5, 5 are opened, and accordingly, the work W is not gripped. At this time, the first locking member 47 occupies a raised position due to advancing (moving upward) of the rod 13, and the second locking members 48 occupy non-locking positions separated from the first locking member 47.

Figure 23:
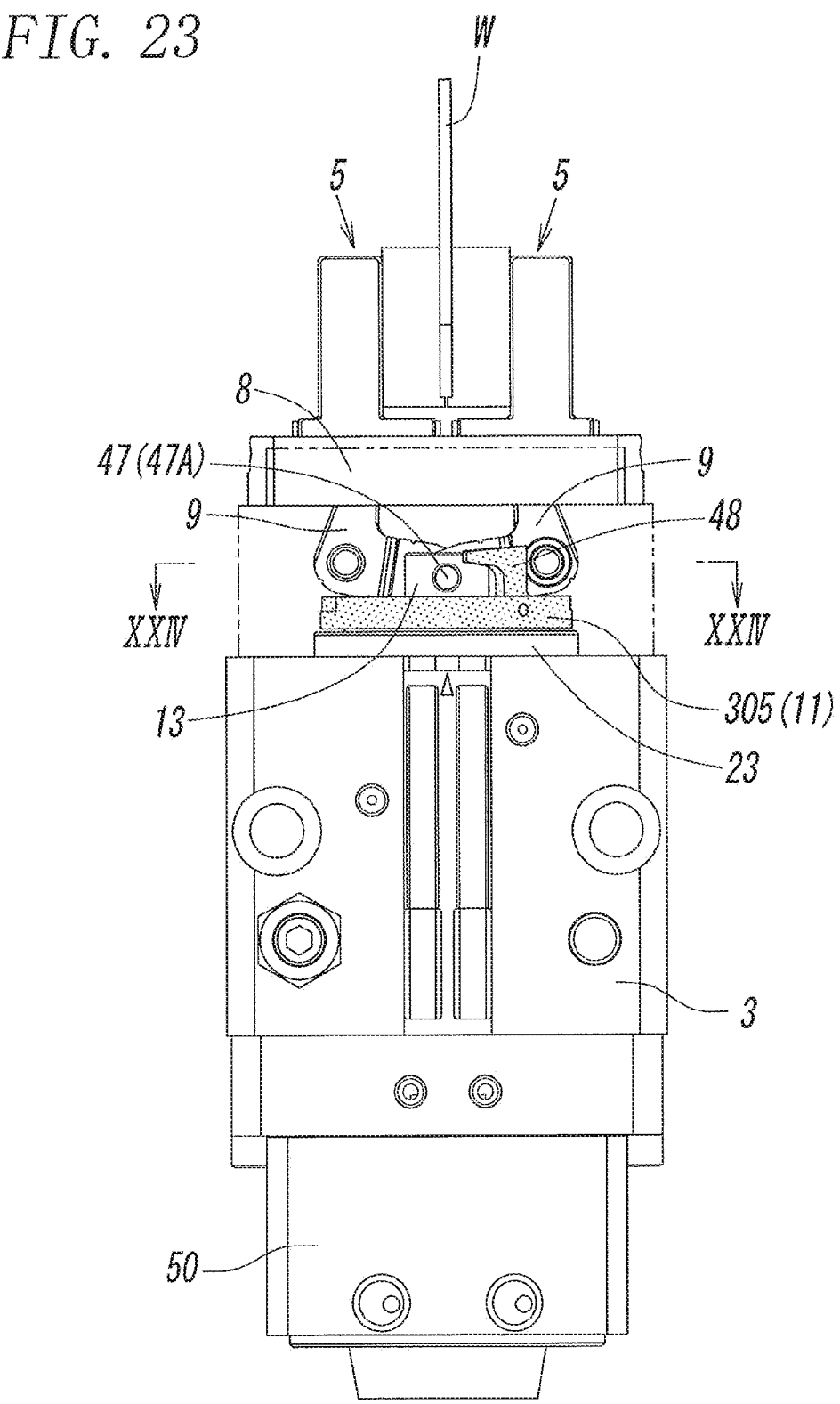
FIG. 23 is a side view of the air chuck with the pair of fingers closed to grip work and the rail holder omitted.
Figure 24:
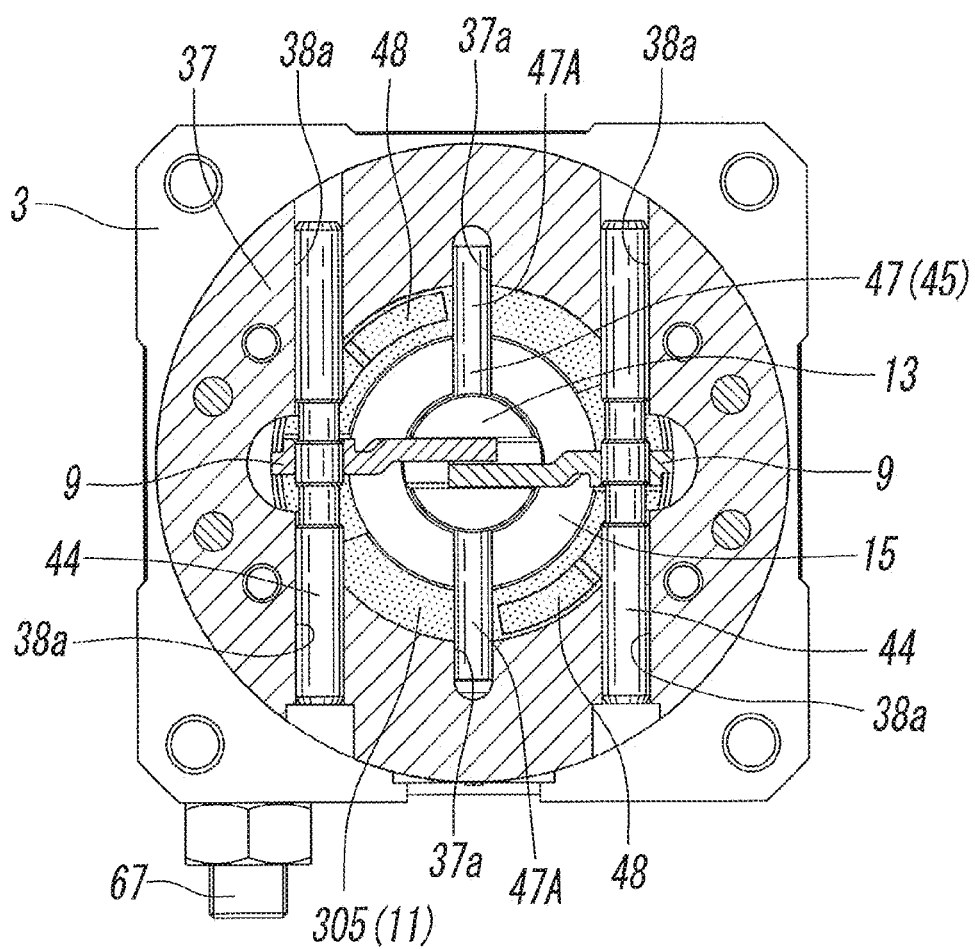
FIG. 24 is a sectional view taken along line XXIV-XXIV illustrated in FIG. 23.

When gripping the work W from this state by using the pair of fingers 5, 5, as illustrated in FIGS. 23 and 24, the rod 13 is retracted (moved downward) by the air cylinder device 4 (see FIG. 18) to close the pair of fingers 5, 5. At this time, the first locking member 47 is also moved downward together with the rod 13.

Figure 25:
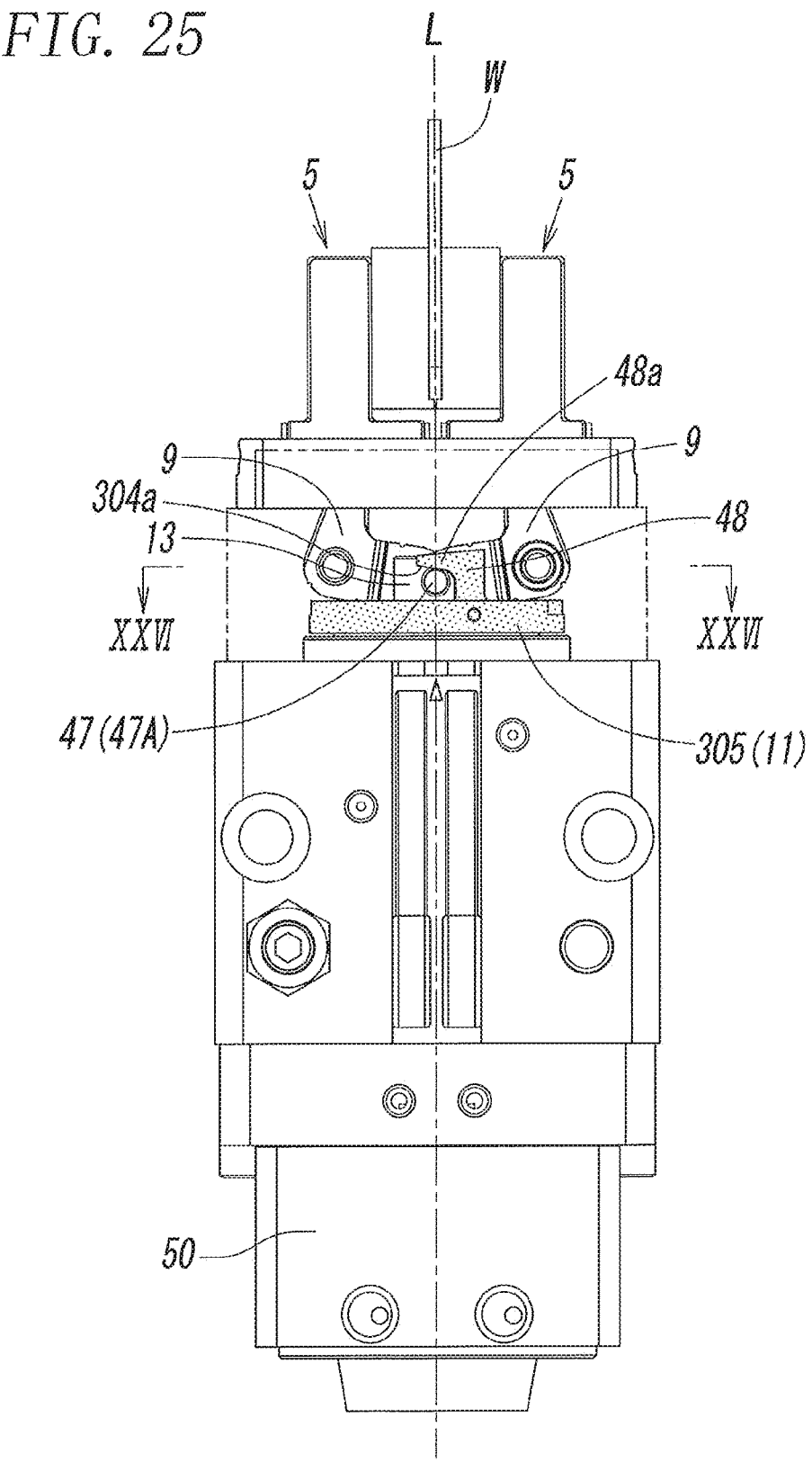
FIG. 25 is a side view of the air chuck with the pair of fingers locked at the work grip positions and the rail holder omitted.
Figure 26:
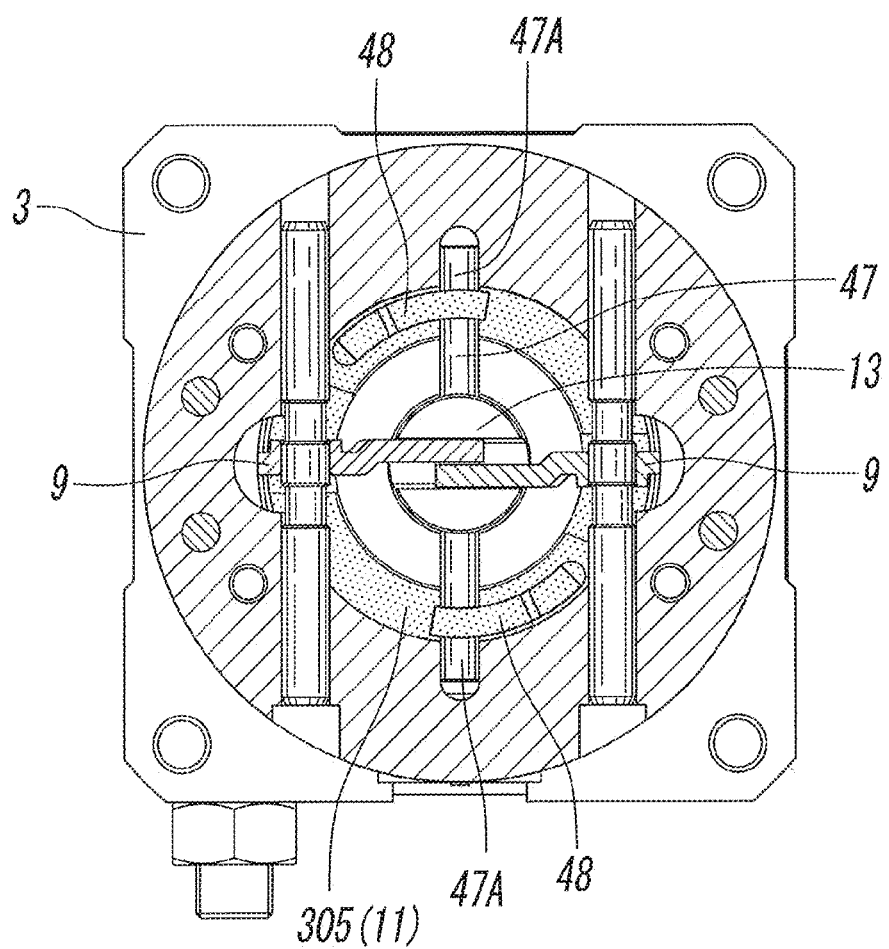
FIG. 26 is a sectional view taken along line XXVI-XXVI illustrated in FIG. 25.

Then, as illustrated in FIGS. 25 and 26, the cylinder tube 11 is rotated clockwise about the axial line L by the drive device 50 so as to displace the two second locking members 48, 48 to the locking positions, thereby retaining the lower wedge surfaces 304a of the second locking members 48, 48 at upper surfaces of the retaining portions 47A of the first locking member 47. Thus, the pair of fingers 5, 5 are locked at the work grip positions.

The work W gripped by the fingers 5, 5 can be released in reverse order of the operations performed when gripping the work W.

Figure 27:
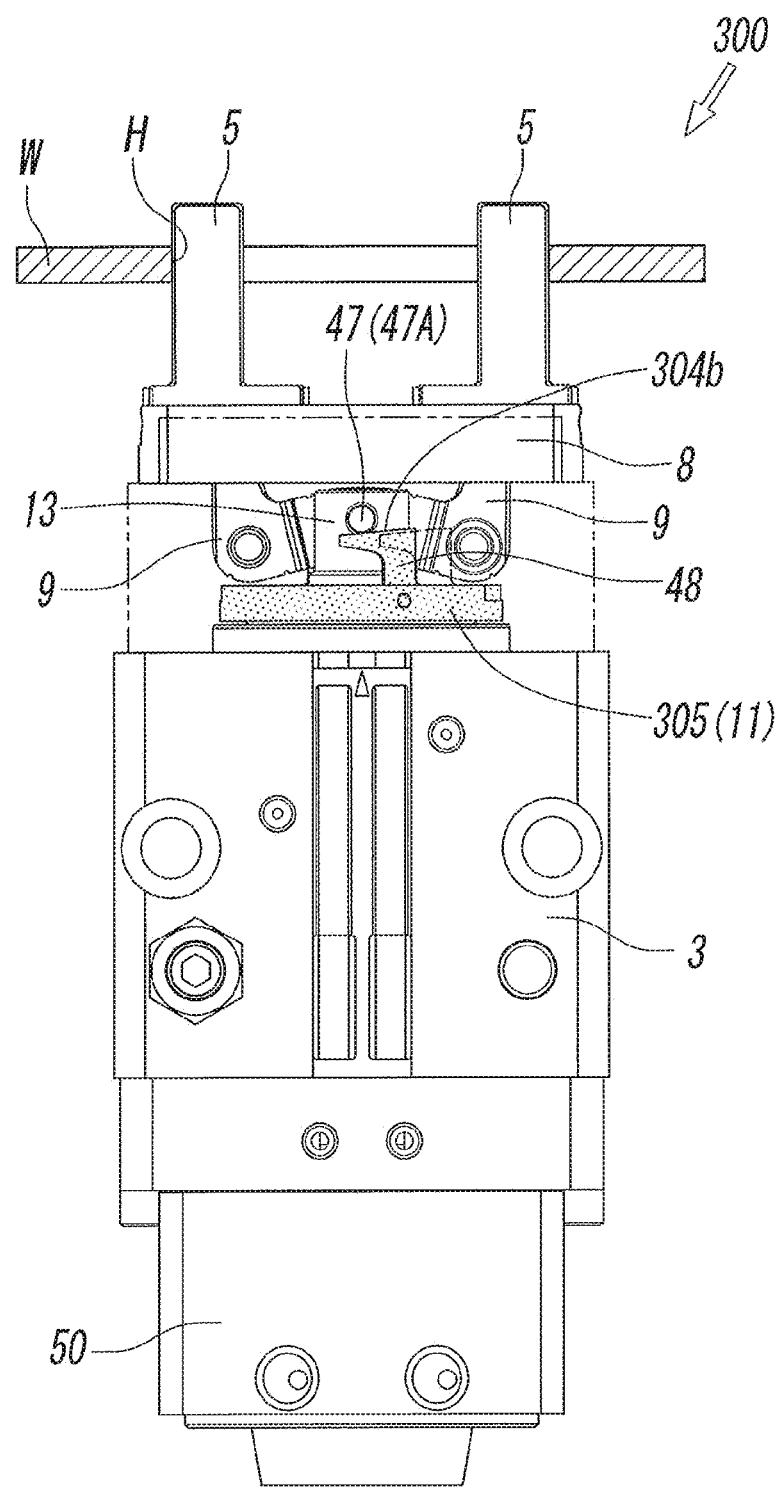
FIG. 27 is a side view of the air chuck with the fingers performing inner-diameter chucking on the work locked at the work grip positions and the rail holder omitted.

As illustrated in FIG. 27, the air chuck 300 can also perform inner-diameter chucking on the work W having a central hole H. This inner-diameter chucking is performed by moving downward the rod 13 by using the air cylinder device 4 to close the pair of fingers 5, 5, inserting, in this state, the fingers 5, 5 into the central hole H of the work W, and then moving upward the rod 13 to open the pair of fingers 5, 5, thereby retaining outer surfaces of the fingers 5, 5 at an inner circumference of the central hole H. At this time, the second locking members 48, 48 occupy, as indicated by a chain line illustrated in FIG. 27, non-locking positions separated from the first locking member 47.

After the inner-diameter chucking has been performed on the work W, the cylinder tube 11 is rotated by the drive device 50 so as to displace the second locking members 48, 48 to the locking positions as indicated by a solid line illustrated in FIG. 27, thereby retaining the upper wedge surfaces 304b of the second locking members 48, 48 at lower surfaces of the retaining portions 47A, 47A at both the ends of the first locking member 47. Thus, the pair of fingers 5, 5 are locked at the work grip positions.

The chuck spacers 6 are not necessarily attached to the fingers 5, 5 when performing the inner-diameter chucking on the work W.

Furthermore, according to the illustrated embodiment, the first locking member 47 also serves as the engagement pin 45, the first locking member 47 may be separately provided from the engagement pin 45.

In the air chuck 300 according to the third embodiment, the first locking member 47 is not rotated, and the second locking members 48, 48 are rotated by the drive device 50 through the cylinder tube 11. Reversely, a configuration in which the second locking members 48, 48 are not rotated, and the first locking member 47 is rotated by the drive device 50 through the cylinder tube 11 can be used. In this case, as is the case with the air chuck 200 according to the second embodiment, the second locking members 48, 48 can be secured to the chuck body 3 with an appropriate support member interposed therebetween, and the piston 12, the rod 13, the first locking member 47, the open/close levers 9, 9, the support rail 8, the fingers 5, 5, and so forth can be rotated together with the cylinder tube 11.

REFERENCE SIGNS LIST 1 chuck mechanism
2 locking mechanism
3 chuck body
5 finger
8 support rail
11 cylinder tube
12 piston
13 rod
18a first pressure chamber
18b second pressure chamber
19a first passage hole
19b second passage hole
24 cylinder hole
26a first annular channel
26b second annular channel
27a first port
27b second port
47 first locking member
47a first wedge surface
48 second locking member
48a second wedge surface
50 drive device 55 support member
63 output shaft
100, 200, 300 air chuck
W work
L axial line

The invention claimed is:

1. An air chuck provided with a locking mechanism, the air chuck comprising:
   a chuck mechanism that operates a piston in a cylinder tube by using action of compressed air and that advances and retracts a rod coupled to the piston so as to open and close a pair of fingers, thereby gripping work; and
   a locking mechanism that locks the pair of fingers at work grip positions;
   wherein the locking mechanism includes
      at least one first locking member that is displaced when the pair of fingers are opened or closed,
      at least one second locking member that retains the at least one first locking member so as to lock the pair of fingers at the work grip positions, and
      a drive device that relatively displaces the at least one first locking member and the at least one second locking member to locking positions where the at least one first locking member and the at least one second locking member are retained at each other and to non-locking positions where the at least one first locking member and the at least one second locking member are separated from each other, and
   wherein the at least one first locking member and the at least one second locking member are displaced to the locking positions and the non-locking positions by relative rotation of the rod about an axial line.

2. The air chuck according to claim 1,
   wherein the cylinder tube is accommodated in a cylinder hole of a chuck body such that the cylinder tube is rotatable about the axial line in a reciprocating manner in a certain angular range, and the cylinder tube is coupled to the drive device, and
   wherein the at least one first locking member or the at least one second locking member is driven to the locking position and the non-locking position by the drive device through the cylinder tube.

3. The air chuck according to claim 2,
   wherein a first annular channel communicating with a first port provided in the chuck body and a second annular channel communicating with a second port provided in the chuck body are formed between an outer circumference of the cylinder tube and an inner circumference of the cylinder hole so as to surround the outer circumference of the cylinder tube, and
   wherein a first passage hole connecting the first annular channel and a first pressure chamber on a one side of the piston to each other and a second passage hole connecting the second annular channel and a second pressure chamber on another side of the piston to each other are formed in a side surface of the cylinder tube.

4. The air chuck according to claim 2,
   wherein the drive device is included by a swinging actuator,
   wherein the swinging actuator includes an output shaft rotated in a reciprocating manner in a certain angular range by the action of the compressed air, and
   wherein the output shaft is coupled to the cylinder tube.

5. The air chuck according to claim 2,
   wherein the at least one first locking member includes a plurality of the first locking members, and the at least one second locking member includes a plurality of the second locking members,
   wherein the pair of fingers are supported by a support rail such that the pair of fingers are able to be opened and closed,
   wherein the plurality of first locking members are respectively attached to the pair of fingers,
   wherein two of the plurality of second locking members are attached to a support member disposed around the support rail,
   wherein one of the support rail and the support member is coupled to the cylinder tube,
   and
   wherein, when the support rail or the support member is rotated in a reciprocating manner by the cylinder tube, the plurality of first locking members and the plurality of second locking members are relatively displaced to positions where the plurality of first locking members and the plurality of second locking members are retained at one another and positions where the plurality of first locking members and the plurality of second locking members are separated from one another.

6. The air chuck according to claim 5,
   wherein the plurality of first locking members and the plurality of second locking members have wedge surfaces retained at one another, and wherein the wedge surfaces are inclined, toward a circumferential direction that is a displacement direction of the plurality of first locking members or the plurality of second locking members, in a direction intersecting the circumferential direction.

7. The air chuck according to claim 5,
   wherein the support member has a ring shape and is disposed so as to surround an outer circumference of the support rail, and wherein the plurality of second locking members are attached to positions opposite to each other in a diameter direction of the support member.

8. The air chuck according to claim 2,
   wherein the at least one first locking member includes a shaft-shaped member provided in the rod in a direction perpendicular to the axial line, and
   wherein the at least one second locking member includes a hook-shaped member able to be retained at the at least one first locking member.

9. The air chuck according to claim 8,
   wherein, even when the cylinder tube is rotated, neither the rod nor the at least one first locking member is rotated together with the cylinder tube, and
   wherein the at least one second locking member is couple to the cylinder tube so as to be rotated together with the cylinder tube.

* * * * *